(12) United States Patent
Sugita

(10) Patent No.: US 10,126,536 B2
(45) Date of Patent: Nov. 13, 2018

(54) ZOOM LENS AND IMAGE PICKUP APPARATUS INCLUDING THE SAME

(71) Applicant: CANON KABUSHIKI KAISHA, Tokyo (JP)

(72) Inventor: Shigenobu Sugita, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/432,244

(22) Filed: Feb. 14, 2017

(65) Prior Publication Data

US 2017/0242228 A1 Aug. 24, 2017

(30) Foreign Application Priority Data

Feb. 24, 2016 (JP) .................................. 2016-032885
Mar. 3, 2016 (JP) .................................. 2016-040916

(51) Int. Cl.
| | | |
|---|---|---|
| *G02B 15/00* | (2006.01) | |
| *G02B 15/20* | (2006.01) | |
| *G02B 7/10* | (2006.01) | |
| *G02B 15/177* | (2006.01) | |
| *G02B 15/14* | (2006.01) | |

(52) U.S. Cl.
CPC ............... *G02B 15/20* (2013.01); *G02B 7/10* (2013.01); *G02B 15/00* (2013.01); *G02B 15/14* (2013.01); *G02B 15/177* (2013.01)

(58) Field of Classification Search
CPC .......... G02B 7/10; G02B 15/00; G02B 15/20; G02B 15/14; G02B 15/177

USPC .................................................. 359/684, 676
See application file for complete search history.

(56) References Cited

U.S. PATENT DOCUMENTS

| 5,185,678 | A | * | 2/1993 | Arimoto | ............... G02B 15/173 |
|---|---|---|---|---|---|
| | | | | | 359/683 |
| 9,110,278 | B2 | | 8/2015 | Sugita | |
| 9,250,424 | B2 | | 2/2016 | Sugita | |
| 9,268,118 | B2 | | 2/2016 | Sugita | |
| 9,268,119 | B2 | | 2/2016 | Sugita | |
| 9,465,203 | B2 | | 10/2016 | Sugita | |
| 9,575,391 | B2 | | 2/2017 | Sugita | |
| 9,989,742 | B2 | * | 6/2018 | Shibayama | ............ G02B 15/14 |
| 2006/0114574 | A1 | * | 6/2006 | Sekita | .................. G02B 15/177 |
| | | | | | 359/689 |

(Continued)

FOREIGN PATENT DOCUMENTS

| JP | H11-44848 A | 2/1999 |
|---|---|---|
| JP | 2006-227526 A | 8/2006 |

(Continued)

*Primary Examiner* — William R Alexander
(74) *Attorney, Agent, or Firm* — Carter, DeLuca, Farrell & Schmidt, LLP

(57) ABSTRACT

Provided is a zoom lens including: a lens unit Ln1 having a negative refractive power; a lens unit Ln2 having a negative refractive power; a lens unit Lp1 having a positive refractive power; and a rear lens group including one or more lens units, the lens unit Ln1, the lens unit Ln2, the lens unit Lp1, and the rear lens group being successively arranged in order from an object side to an image side, in which the lens unit Ln1 and the lens unit Lp1 are moved along the same locus during zooming, and in which the lens unit Ln2 is moved toward the object side during focusing from infinity to proximity.

26 Claims, 19 Drawing Sheets

(56) References Cited

U.S. PATENT DOCUMENTS

| | | | | |
|---|---|---|---|---|
| 2007/0070517 A1* | 3/2007 | Harada | ............... | G02B 15/177 |
| | | | | 359/680 |
| 2013/0088786 A1* | 4/2013 | Sugita | ................... | G02B 15/14 |
| | | | | 359/684 |
| 2013/0162884 A1* | 6/2013 | Tashiro | ................. | G02B 15/14 |
| | | | | 348/345 |
| 2013/0335830 A1* | 12/2013 | Tashiro | ................. | G02B 15/14 |
| | | | | 359/683 |
| 2013/0342716 A1* | 12/2013 | Yamamoto | ............. | G02B 13/18 |
| | | | | 348/208.11 |
| 2014/0268364 A1* | 9/2014 | Hagiwara | ............. | G02B 15/14 |
| | | | | 359/683 |
| 2014/0320976 A1* | 10/2014 | Nakahara | ............. | G02B 15/177 |
| | | | | 359/680 |
| 2015/0015745 A1* | 1/2015 | Miyajima | ............. | G02B 15/16 |
| | | | | 348/240.1 |
| 2015/0226945 A1* | 8/2015 | Matsui | ................ | G02B 15/173 |
| | | | | 348/335 |
| 2015/0277091 A1 | 10/2015 | Sugita | | |
| 2016/0131879 A1 | 5/2016 | Sugita | | |
| 2017/0160526 A1* | 6/2017 | Okumura | ............. | G02B 5/005 |

FOREIGN PATENT DOCUMENTS

| | | |
|---|---|---|
| JP | 2008-292562 A | 12/2008 |
| JP | 2013-011914 A | 1/2013 |
| JP | 2015-72499 A | 4/2015 |

\* cited by examiner

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, and is suitable to an image pickup optical system used in an image pickup apparatus, e.g., a digital camera, a video camera, a TV camera, a monitoring camera, or a silver-halide film camera.

Description of the Related Art

As an image pickup optical system used in an image pickup apparatus, there is demanded an image pickup optical system, which is capable of moving a focus lens at high speed and with high accuracy during focusing, and which is reduced in image magnification change during focusing.

A lens unit arranged closest to an object side in the image pickup optical system tends to be increased in size and weight. Therefore, there is known a zoom lens, which uses, for focusing, a lens unit arranged on an image side of the lens unit arranged closest to the object side.

In Japanese Patent Application Laid-Open No. 2015-72499, there is disclosed a zoom lens, including in order from an object side to an image side a first lens unit to a fifth lens unit having positive, negative, positive, negative, and positive refractive powers, and in which the fourth lens unit is configured to move during focusing.

In Japanese Patent Application Laid-Open No. 2013-011914, there is disclosed a zoom lens, including in order from an object side to an image side, a first lens unit to a sixth lens unit having positive, negative, positive, negative, positive, and positive refractive powers, and in which the fourth lens unit is configured to move during focusing.

In Japanese Patent Application Laid-Open No. 2006-227526, there is disclosed a zoom lens, including in order from an object side to an image side a first lens unit to a fifth lens unit having positive, negative, positive, negative, and positive refractive powers, and in which the second lens unit is configured to move during focusing.

In Japanese Patent Application Laid-Open No. H11-44848, there is disclosed a zoom lens, including in order from an object side to an image side a first lens unit to a fifth lens unit having positive, negative, positive, negative, and positive refractive powers, and in which a part of the second lens unit is configured to move during focusing.

In Japanese Patent Application Laid-Open No. 2008-292562, there is disclosed a zoom lens, including in order from an object side to an image side, a first lens unit to a fourth lens unit having positive, negative, positive, and positive refractive powers, and in which the second lens unit is configured to move during focusing.

In general, when the number of constituent lenses of the focus lens unit is reduced in order to reduce the focus lens unit in size and weight, residual aberrations in the focus lens unit are increased. Therefore, the aberration variations during focusing are increased, and hence it becomes difficult to obtain good optical performance over the entire object distance from a long distance to a short distance.

Meanwhile, when a refractive power of the focus lens unit is reduced in order to reduce the aberration variations during focusing, a movement amount of the focus lens unit during focusing is increased, and a total length of the zoom lens is increased. In order to obtain a zoom lens having a small size as the entire system, being capable of performing focusing at high speed, and having small aberration variations and a small image magnification change during focusing, it is important to appropriately set the number of lens units, the refractive powers of the respective lens units, a lens configuration, and the like.

SUMMARY OF THE INVENTION

It is an object of the present invention to provide a zoom lens, which includes a small focusing lens unit and has a small image magnification change during focusing, thereby being small as the entire system and having high optical performance.

According to one embodiment of the present invention, there is provided a zoom lens, including, successively arranged in order from an object side to an image side: a lens unit Ln1 having a negative refractive power; a lens unit Ln2 having a negative refractive power; a lens unit Lp1 having a positive refractive power; and a rear lens group including one or more lens units, in which an interval between each pair of adjacent lens units is changed during zooming, in which the lens unit Ln1 and the lens unit Lp1 are moved along the same locus during zooming, and in which the lens unit Ln2 is moved toward the object side during focusing from infinity to proximity.

Further features of the present invention will become apparent from the following description of exemplary embodiments with reference to the attached drawings.

DESCRIPTION OF THE EMBODIMENTS

Now, exemplary embodiments of the present invention are described in detail with reference to the attached drawings. A zoom lens according to the present invention includes, successively arranged in order from an object side to an image side, a lens unit Ln1 having a negative refractive power (reciprocal of focal length), a lens unit Ln2 having a negative refractive power, a lens unit Lp1 having a positive refractive power, and a rear lens group including one or more lens units. An interval between each pair of adjacent lens units is changed during zooming. The lens unit Ln1 and the lens unit Lp1 are configured to move along the same locus during zooming, and the lens unit Ln2 is configured to move toward the object side during focusing from infinity to proximity.

Figure 1:
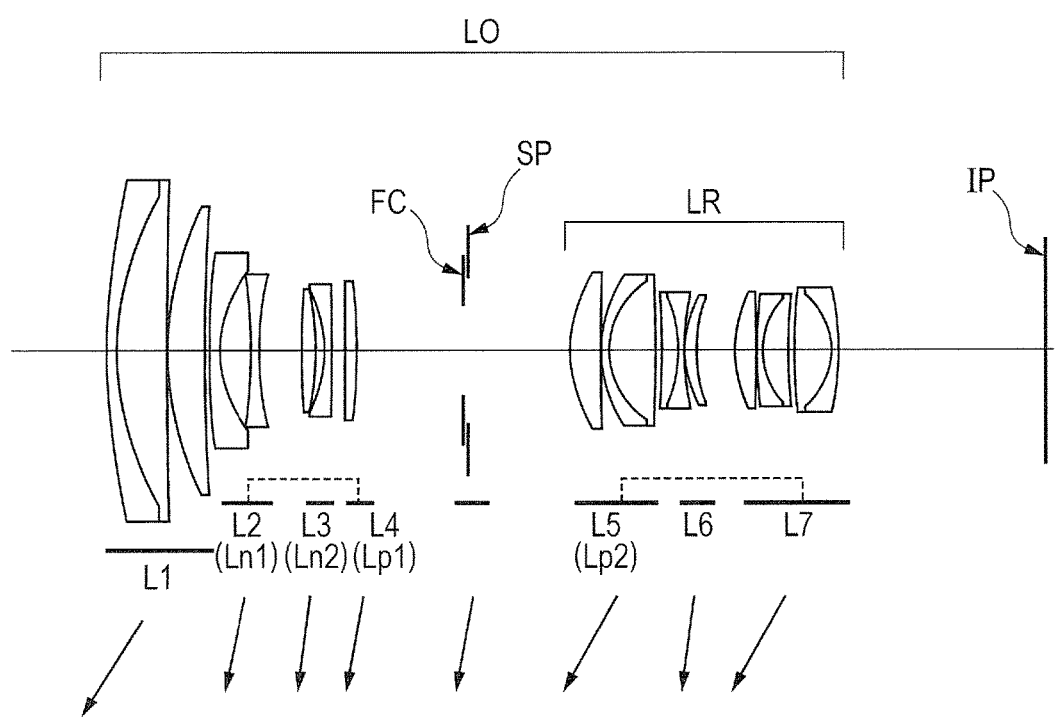
FIG. 1 is a lens cross-sectional view of Embodiment 1 of the present invention.
Figure 2A:
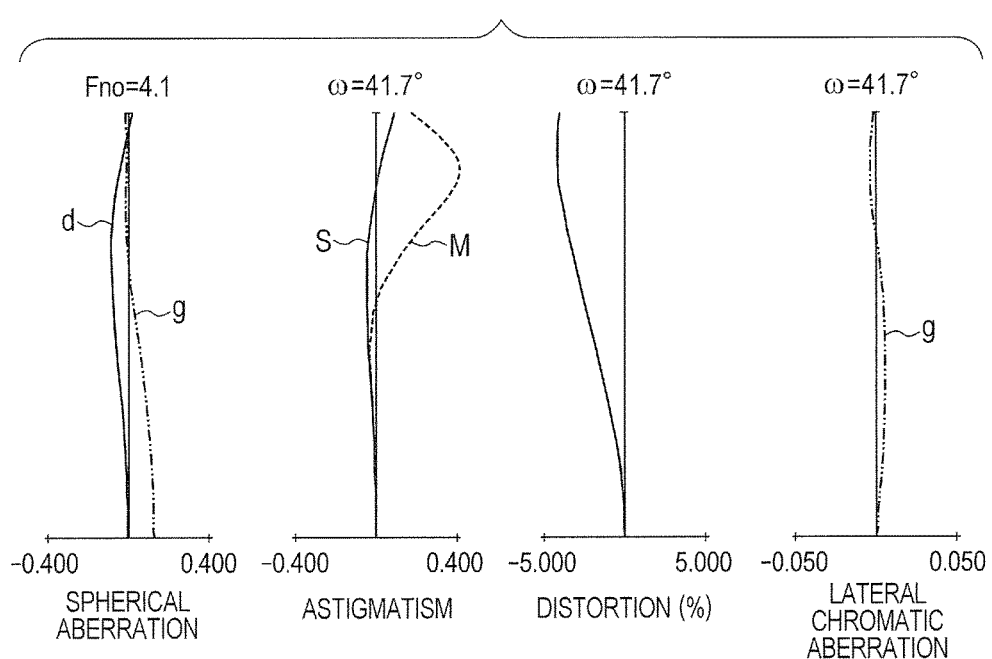
FIG. 2A is a longitudinal aberration diagram of Embodiment 1 of the present invention at a wide angle end when focused at infinity.
Figure 2B:
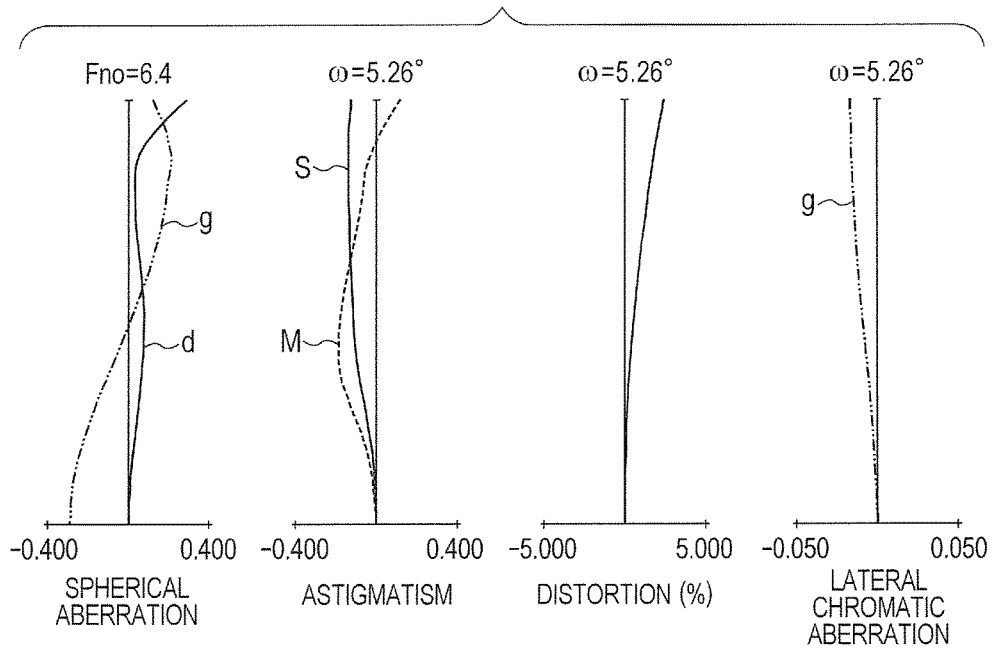
FIG. 2B is a longitudinal aberration diagram of Embodiment 1 of the present invention at a telephoto end when focused at infinity.
Figure 3A:
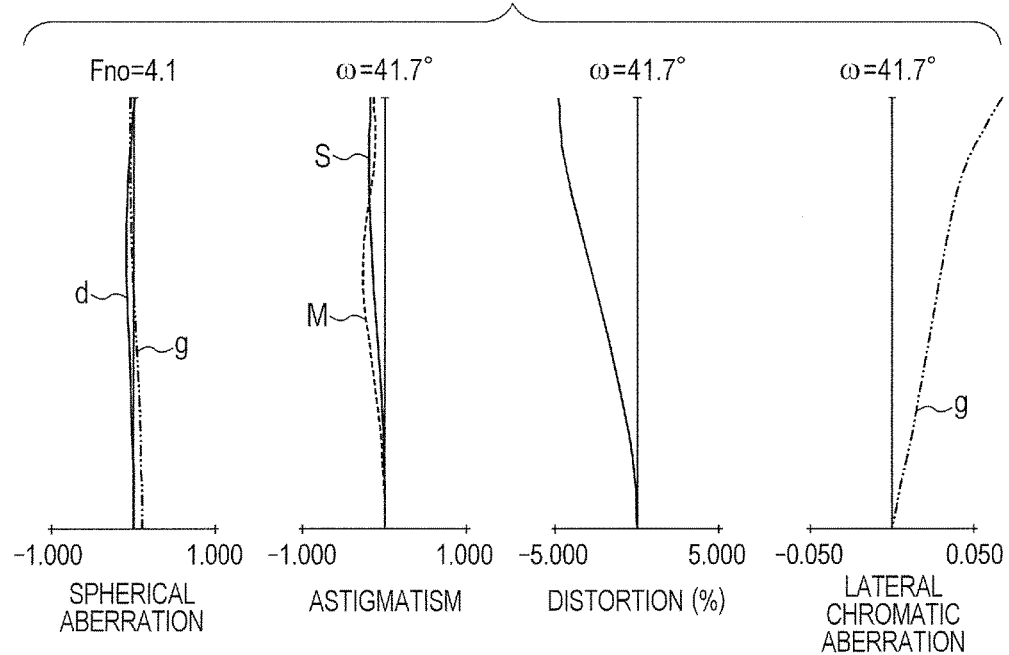
FIG. 3A is a longitudinal aberration diagram of Embodiment 1 of the present invention at the wide angle end when focused at proximity.
Figure 3B:
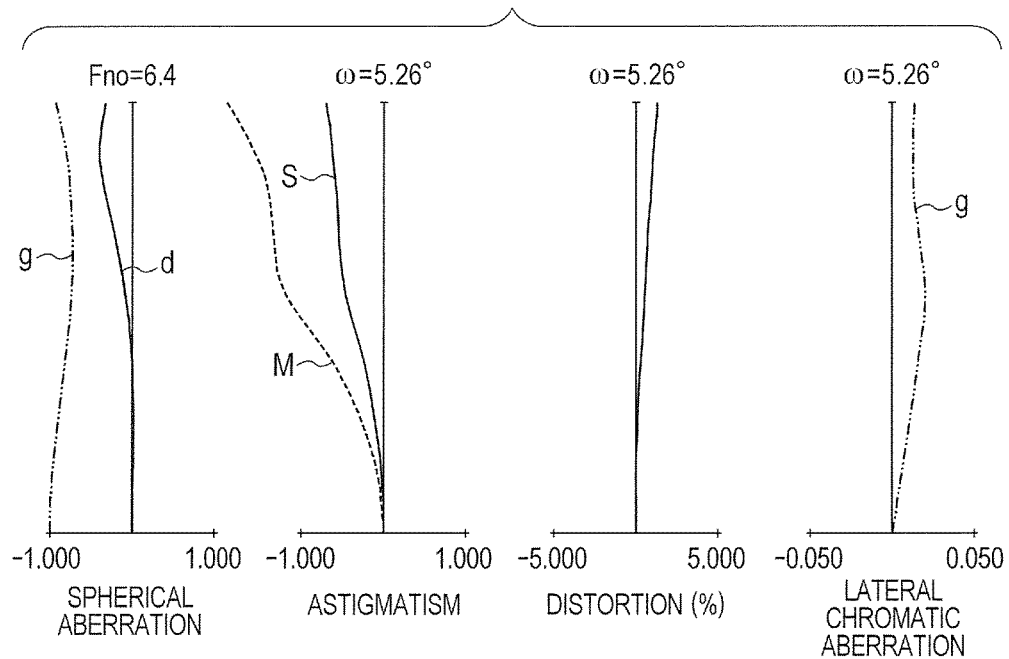
FIG. 3B is a longitudinal aberration diagram of Embodiment 1 of the present invention at the telephoto end when focused at proximity.

FIG. 1 is a lens cross-sectional view of Embodiment 1 of the present invention at a wide angle end. FIG. 2A and FIG. 2B are aberration diagrams of Embodiment 1 at the wide angle end and a telephoto end, respectively, when focused at infinity. FIG. 3A and FIG. 3B are aberration diagrams of Embodiment 1 at the wide angle end and the telephoto end, respectively, when focused at proximity. Embodiment 1 relates to a zoom lens having a zoom ratio of 9.67 and an F-number of from 4.10 to 6.40. The term "proximity" as used in this embodiment is 500 mm at the wide angle end and 700 mm at the telephoto end from an image plane when numerical data, which is to be described later, is expressed in units of mm (the same applies hereinafter).

Figure 4:
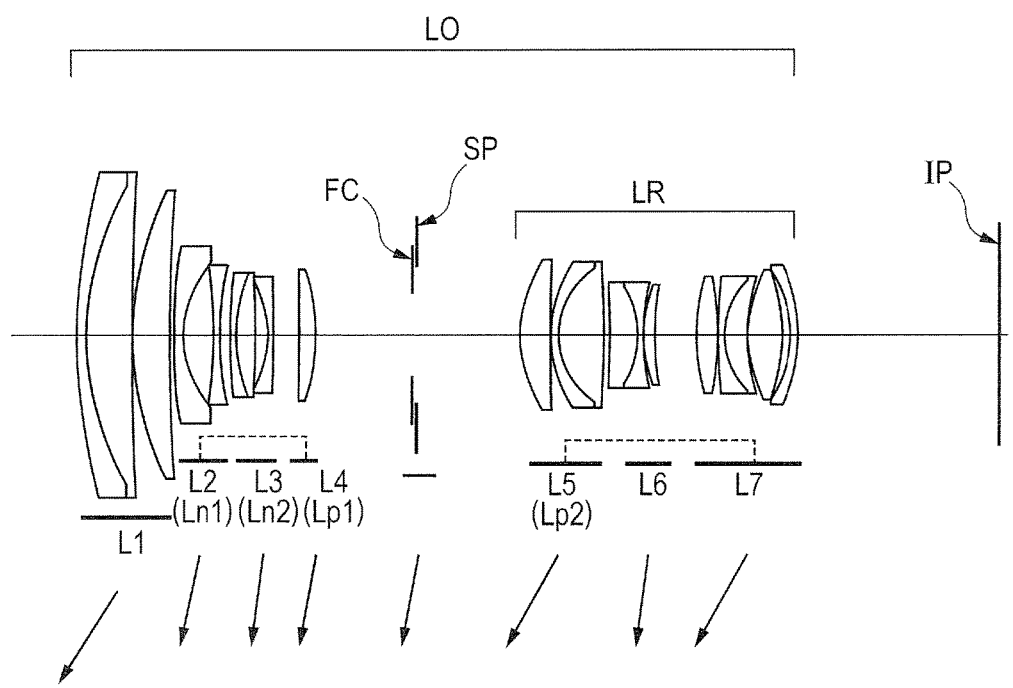
FIG. 4 is a lens cross-sectional view of Embodiment 2 of the present invention.
Figure 5A:
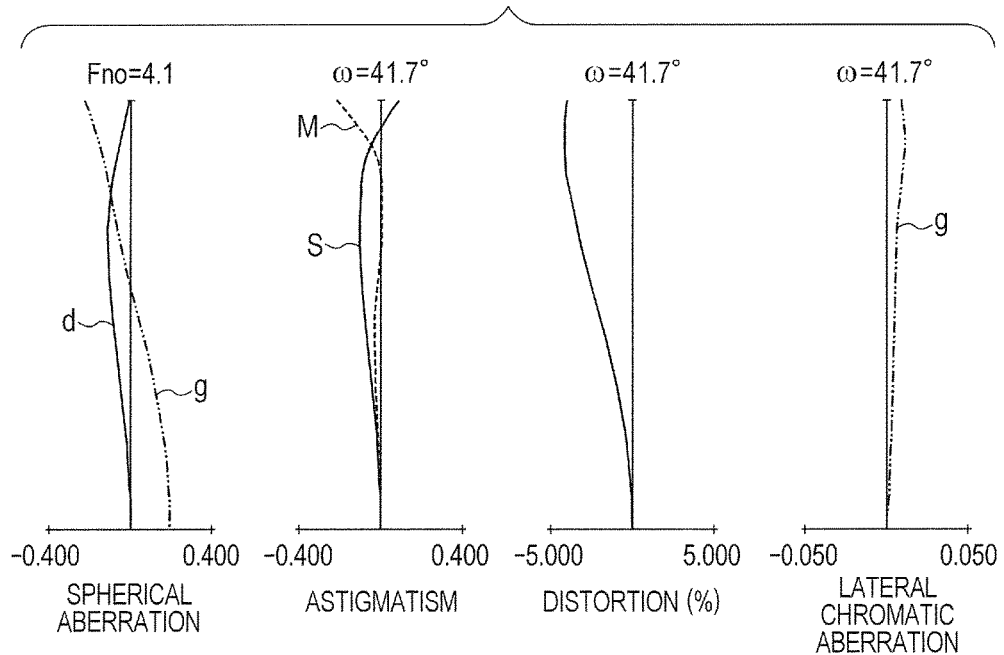
FIG. 5A is a longitudinal aberration diagram of Embodiment 2 of the present invention at a wide angle end when focused at infinity.
Figure 5B:
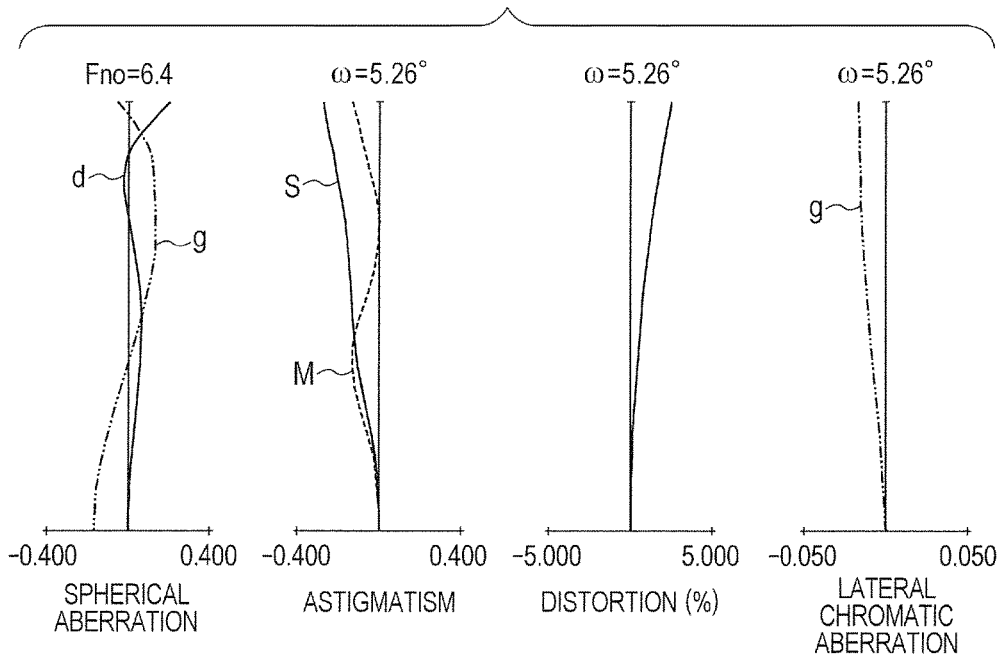
FIG. 5B is a longitudinal aberration diagram of Embodiment 2 of the present invention at a telephoto end when focused at infinity.
Figure 6A:
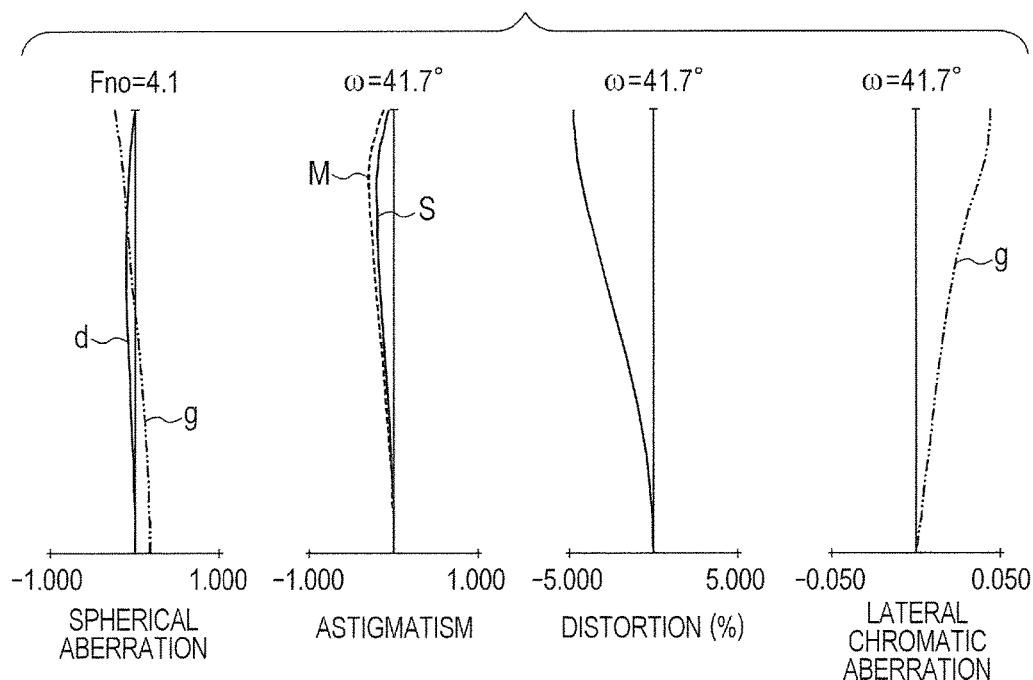
FIG. 6A is a longitudinal aberration diagram of Embodiment 2 of the present invention at the wide angle end when focused at proximity.
Figure 6B:
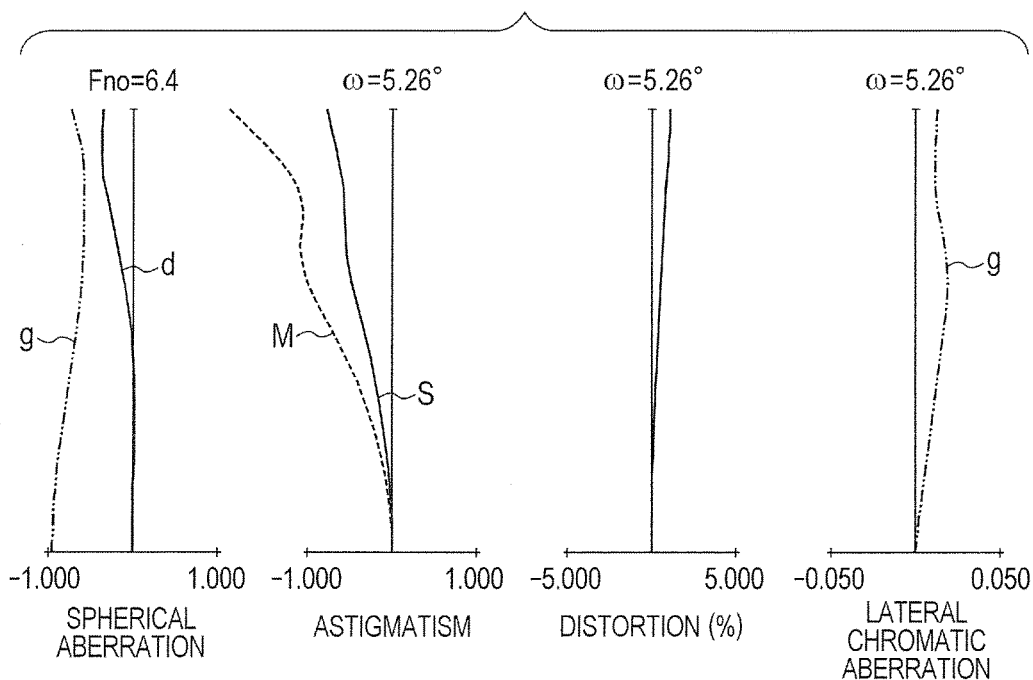
FIG. 6B is a longitudinal aberration diagram of Embodiment 2 of the present invention at the telephoto end when focused at proximity.

FIG. 4 is a lens cross-sectional view of Embodiment 2 of the present invention at a wide angle end. FIG. 5A and FIG. 5B are aberration diagrams of Embodiment 2 at the wide angle end and a telephoto end, respectively, when focused at infinity. FIG. 6A and FIG. 6B are aberration diagrams of Embodiment 2 at the wide angle end and the telephoto end, respectively, when focused at proximity. Embodiment 2 relates to a zoom lens having a zoom ratio of 9.67 and an F-number of from 4.10 to 6.40. The term "proximity" as used in this embodiment is 700 mm at the wide angle end and 700 mm at the telephoto end from an image plane.

Figure 7:
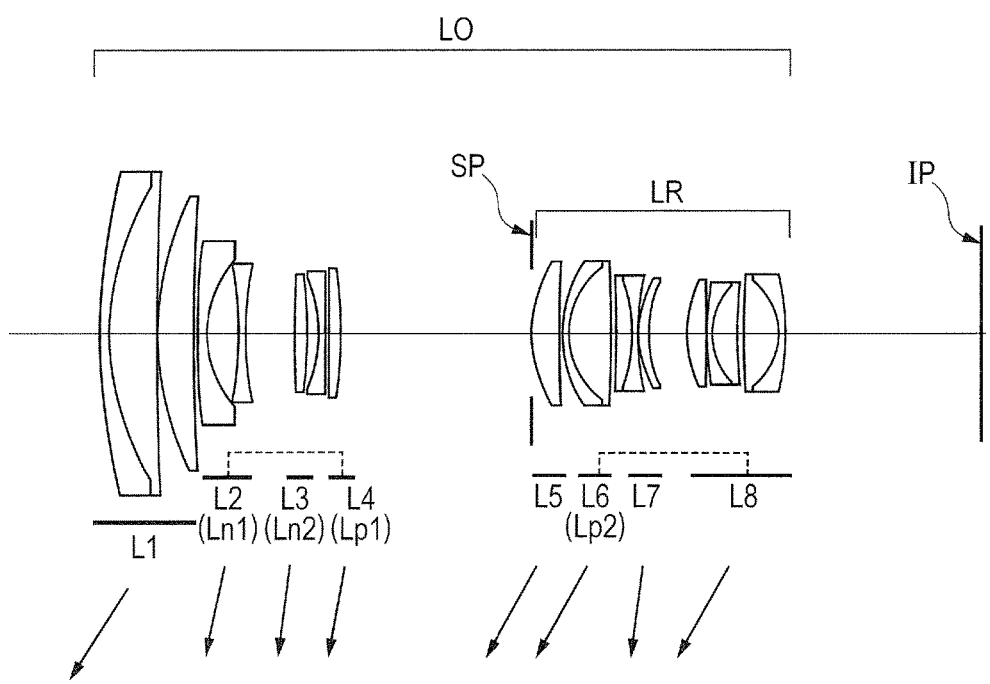
FIG. 7 is a lens cross-sectional view of Embodiment 3 of the present invention.
Figure 8A:
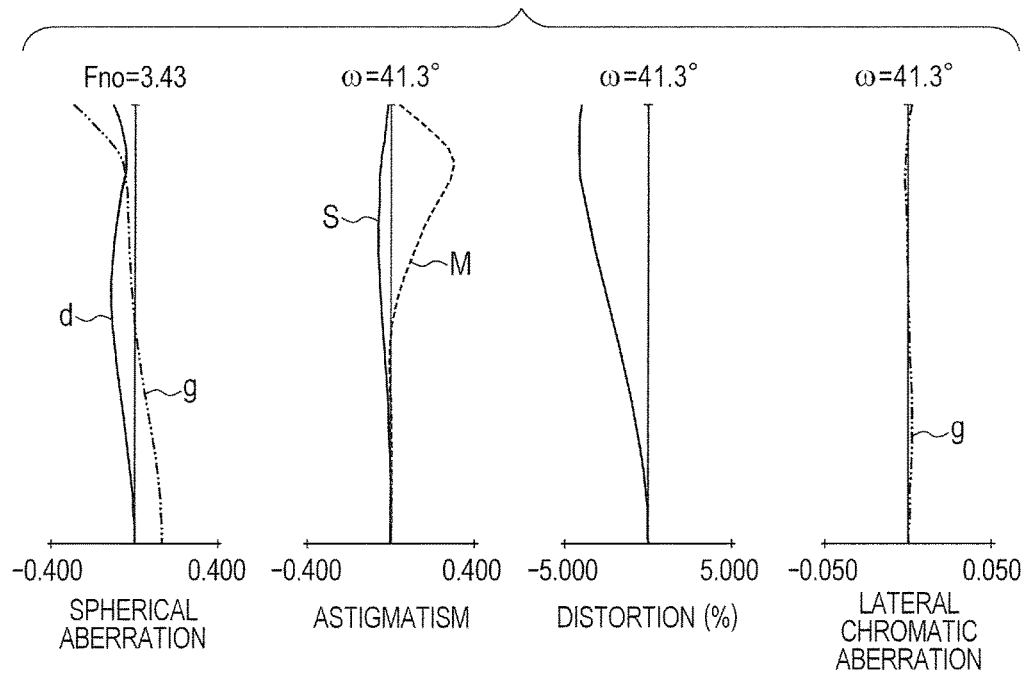
FIG. 8A is a longitudinal aberration diagram of Embodiment 3 of the present invention at a wide angle end when focused at infinity.
Figure 8B:
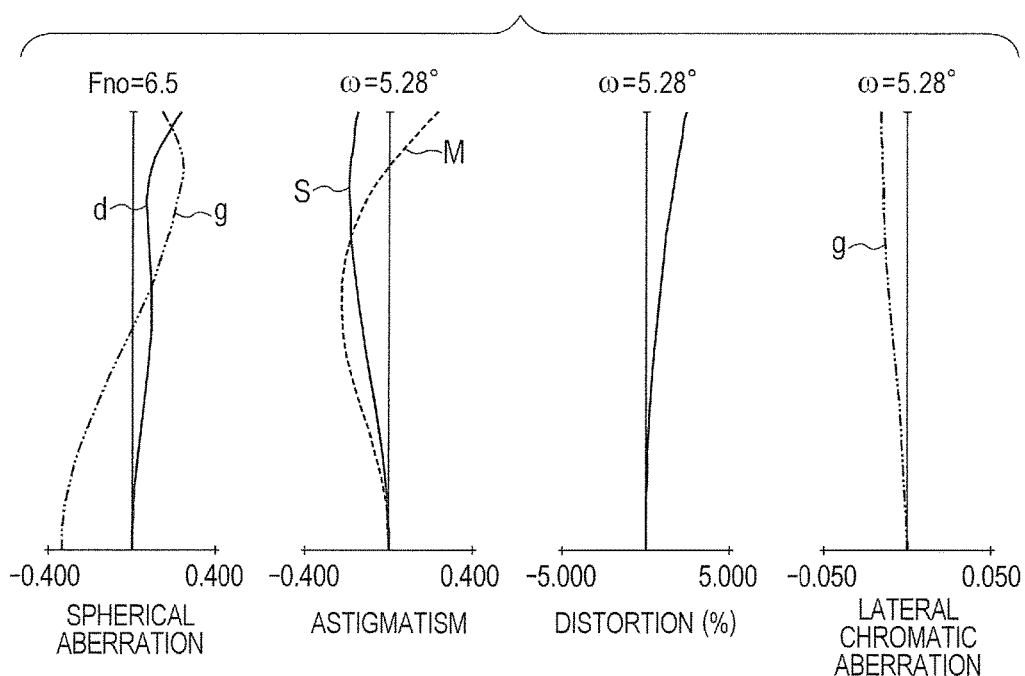
FIG. 8B is a longitudinal aberration diagram of Embodiment 3 of the present invention at a telephoto end when focused at infinity.
Figure 9A:
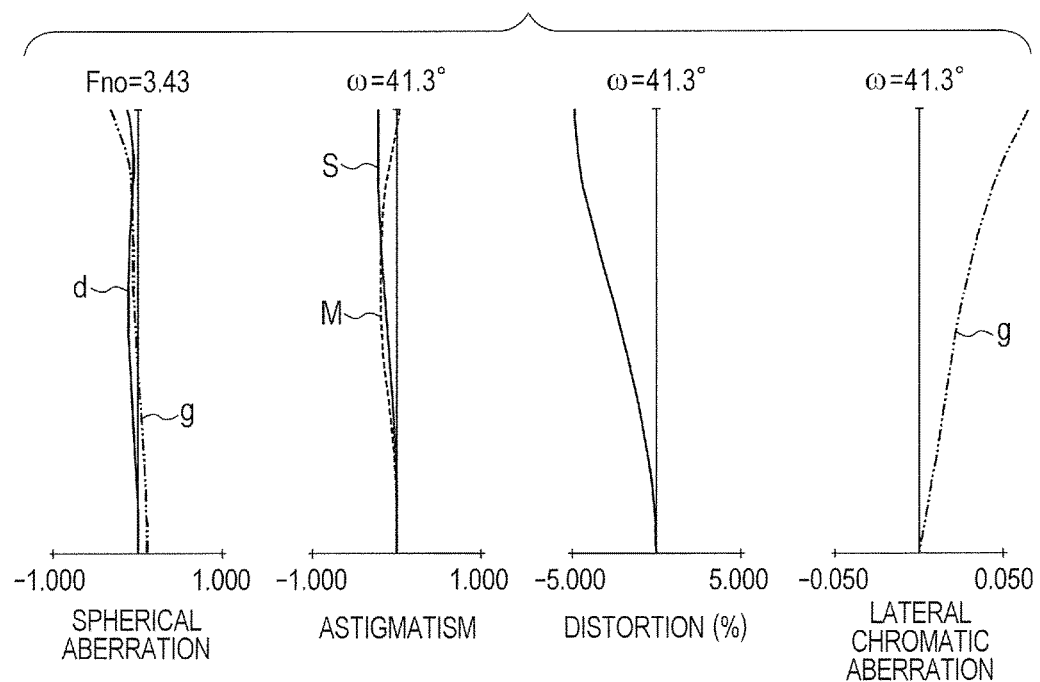
FIG. 9A is a longitudinal aberration diagram of Embodiment 3 of the present invention at the wide angle end when focused at proximity.
Figure 9B:
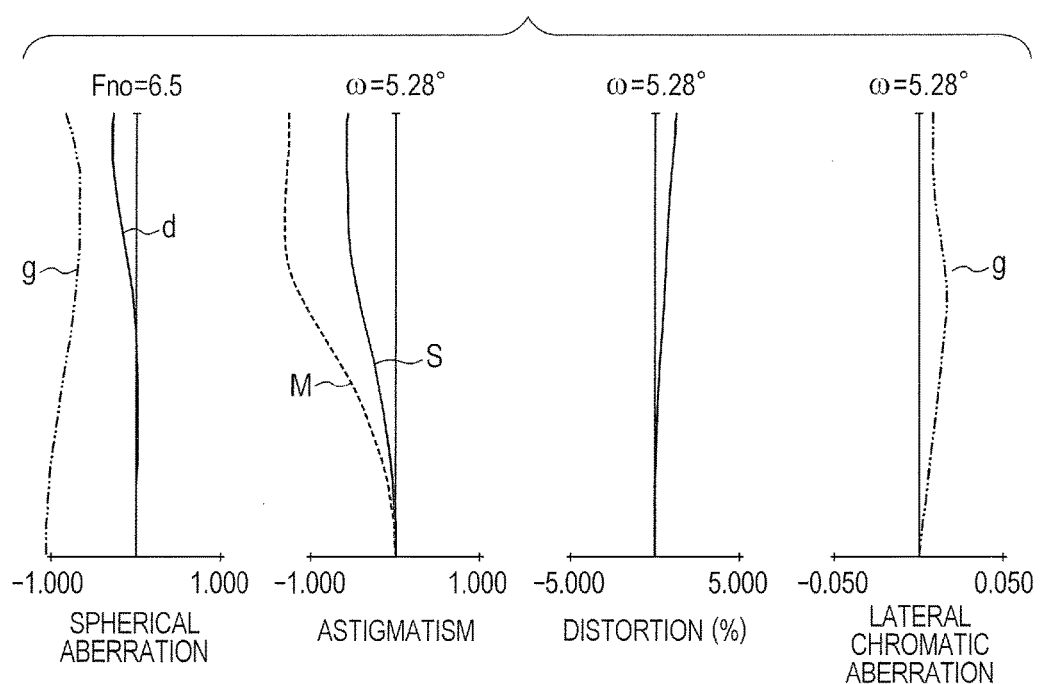
FIG. 9B is a longitudinal aberration diagram of Embodiment 3 of the present invention at the telephoto end when focused at proximity.

FIG. 7 is a lens cross-sectional view of Embodiment 3 of the present invention at a wide angle end. FIG. 8A and FIG. 8B are aberration diagrams of Embodiment 3 at the wide angle end and a telephoto end, respectively, when focused at infinity. FIG. 9A and FIG. 9B are aberration diagrams of Embodiment 3 at the wide angle end and the telephoto end, respectively, when focused at proximity. Embodiment 3 relates to a zoom lens having a zoom ratio of 9.51 and an F-number of from 3.43 to 6.50. The term "proximity" as used in this embodiment is 500 mm at the wide angle end and 800 mm at the telephoto end from an image plane.

Figure 10:
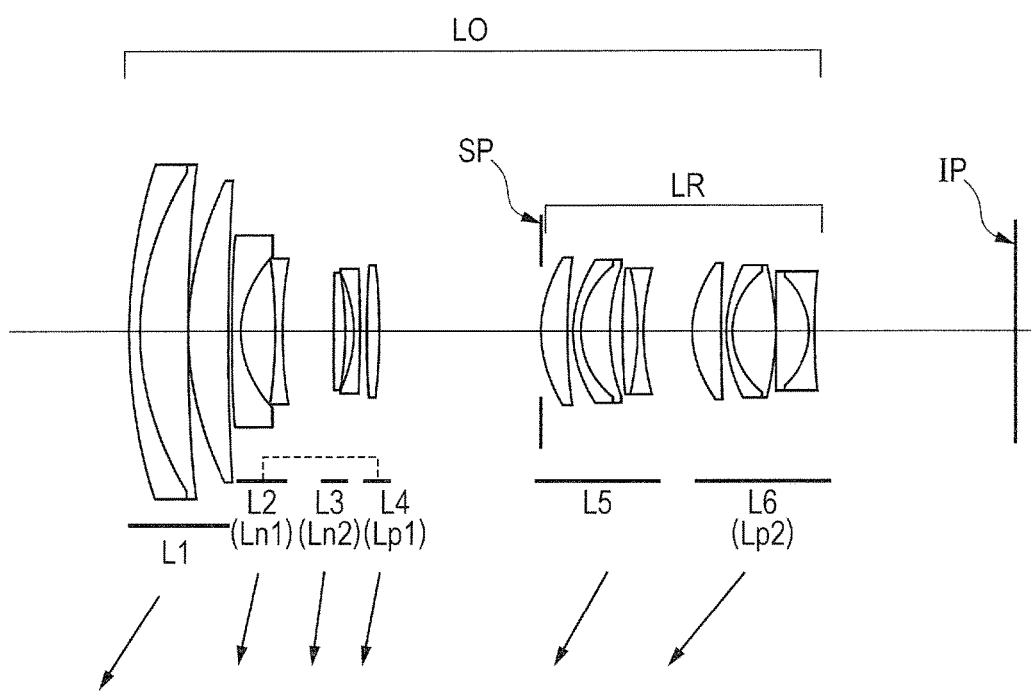
FIG. 10 is a lens cross-sectional view of Embodiment 4 of the present invention.
Figure 11A:
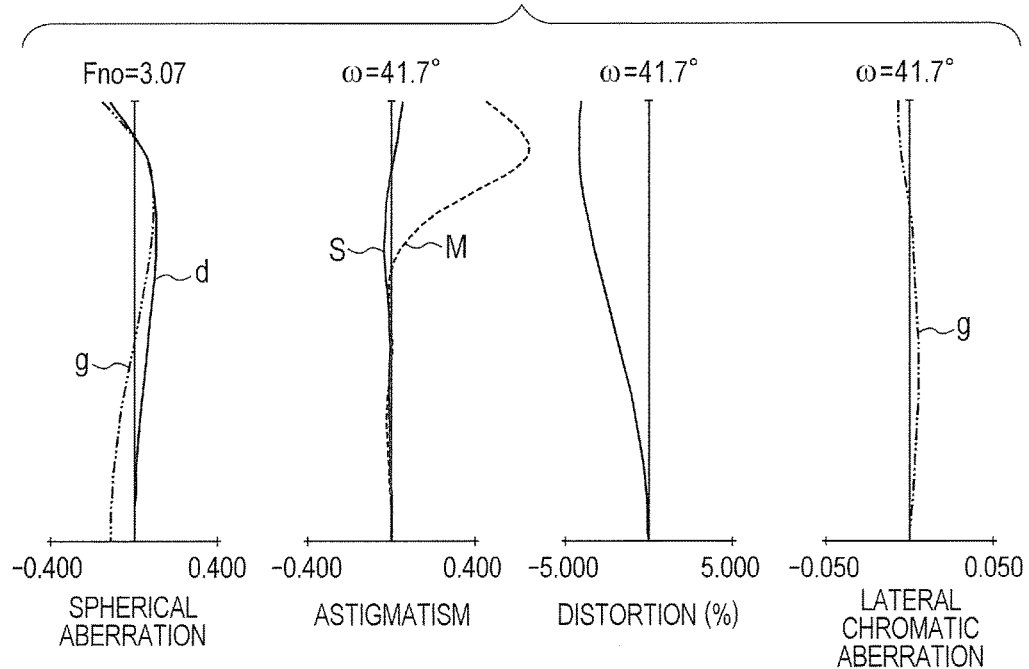
FIG. 11A is a longitudinal aberration diagram of Embodiment 4 of the present invention at a wide angle end when focused at infinity.
Figure 11B:
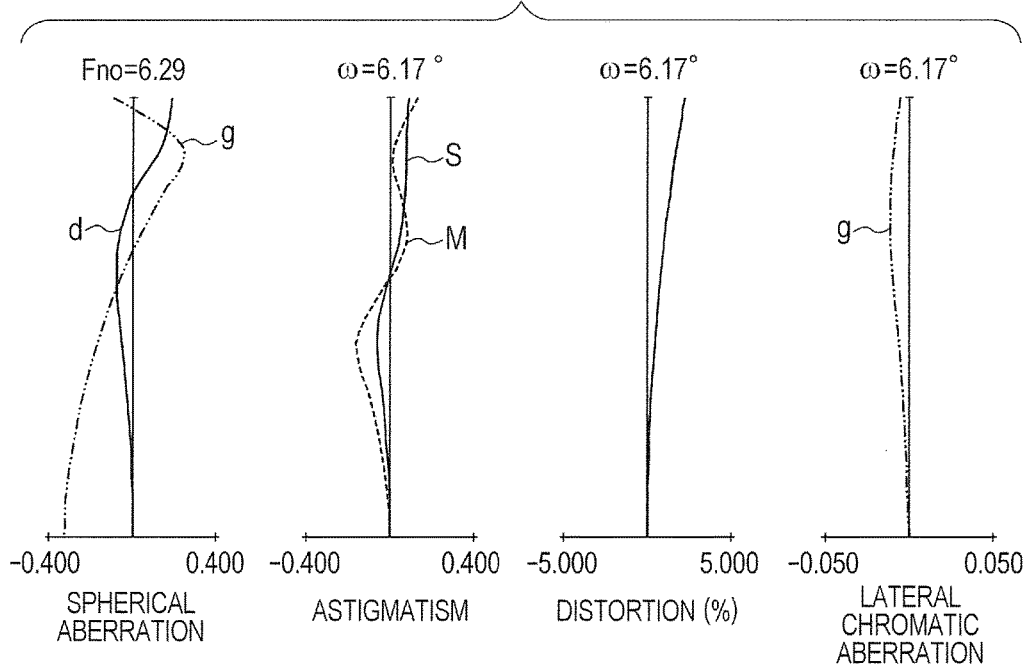
FIG. 11B is a longitudinal aberration diagram of Embodiment 4 of the present invention at a telephoto end when focused at infinity.
Figure 12A:
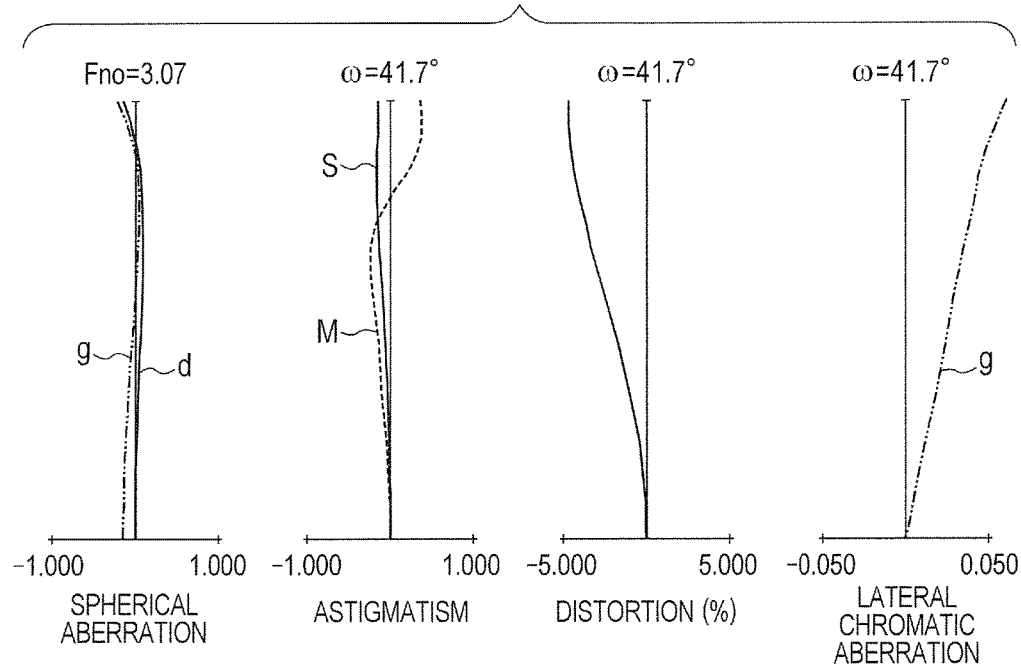
FIG. 12A is a longitudinal aberration diagram of Embodiment 4 of the present invention at the wide angle end when focused at proximity.
Figure 12B:
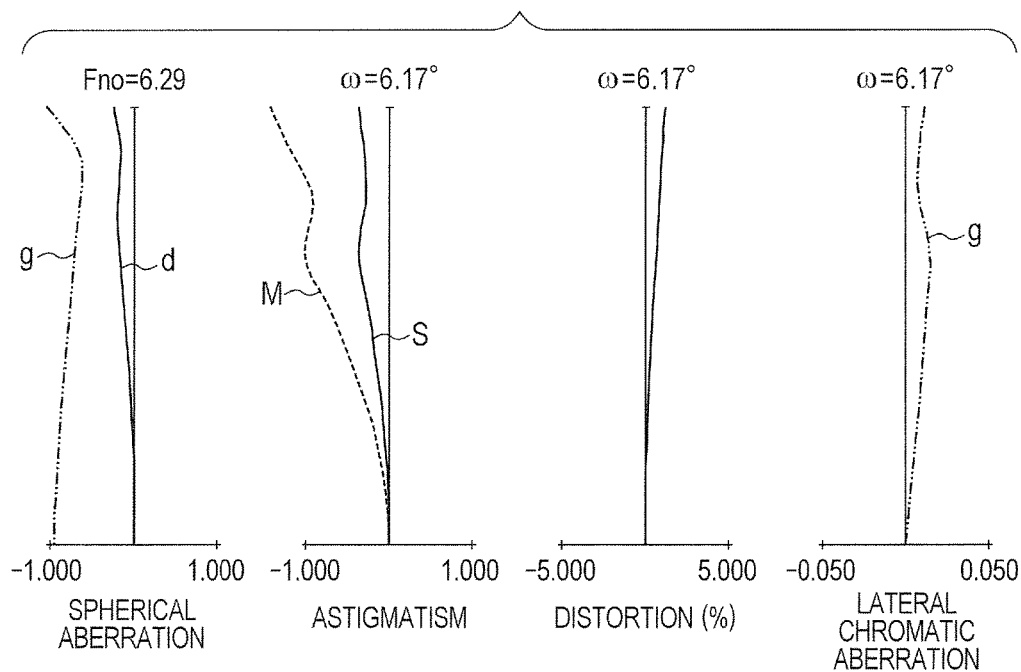
FIG. 12B is a longitudinal aberration diagram of Embodiment 4 of the present invention at the telephoto end when focused at proximity.

FIG. 10 is a lens cross-sectional view of Embodiment 4 of the present invention at a wide angle end. FIG. 11A and FIG. 11B are aberration diagrams of Embodiment 4 at the wide angle end and a telephoto end, respectively, when focused at infinity. FIG. 12A and FIG. 12B are aberration diagrams of Embodiment 4 at the wide angle end and the telephoto end, respectively, when focused at proximity. Embodiment 4 relates to a zoom lens having a zoom ratio of 8.23 and an F-number of from 3.07 to 6.29. The term "proximity" as used in this embodiment is 500 mm at the wide angle end and 800 mm at the telephoto end from an image plane.

Figure 13:
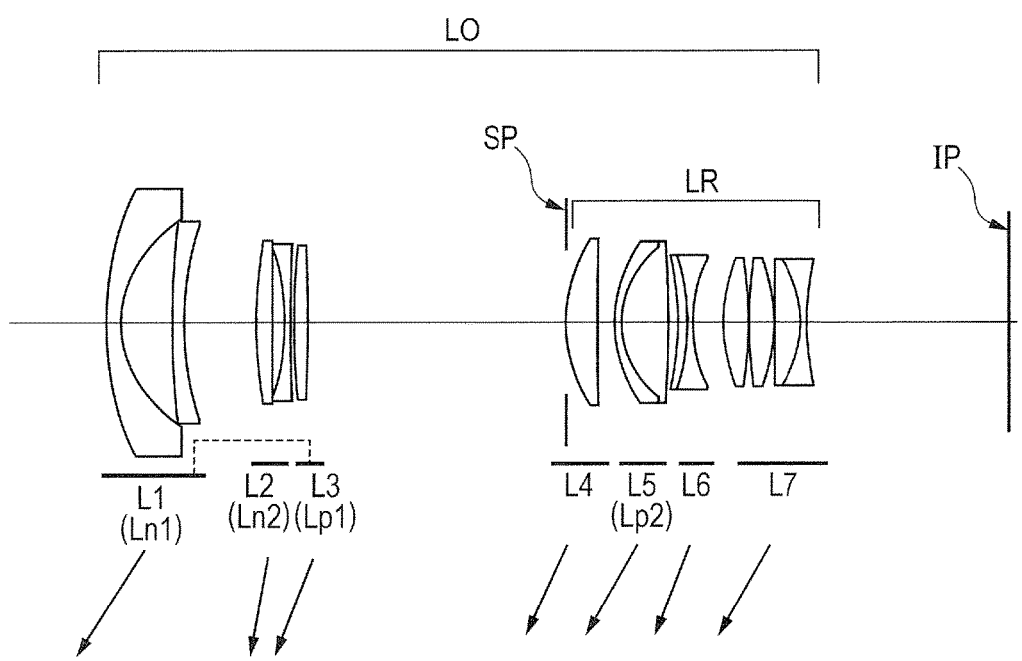
FIG. 13 is a lens cross-sectional view of Embodiment 5 of the present invention.
Figure 14A:
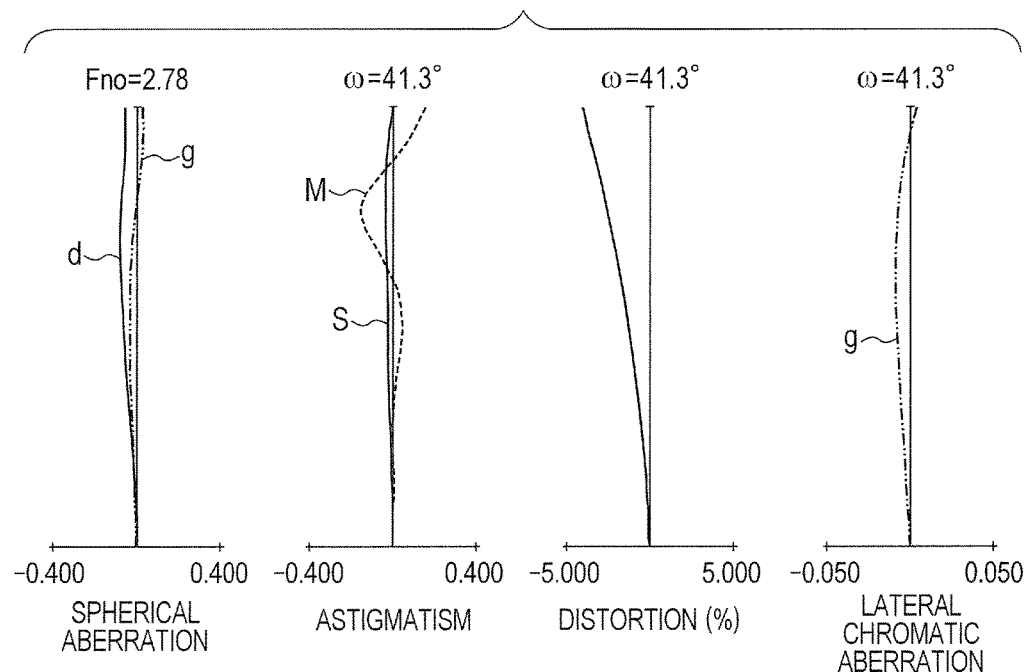
FIG. 14A is a longitudinal aberration diagram of Embodiment 5 of the present invention at a wide angle end when focused at infinity.
Figure 14B:
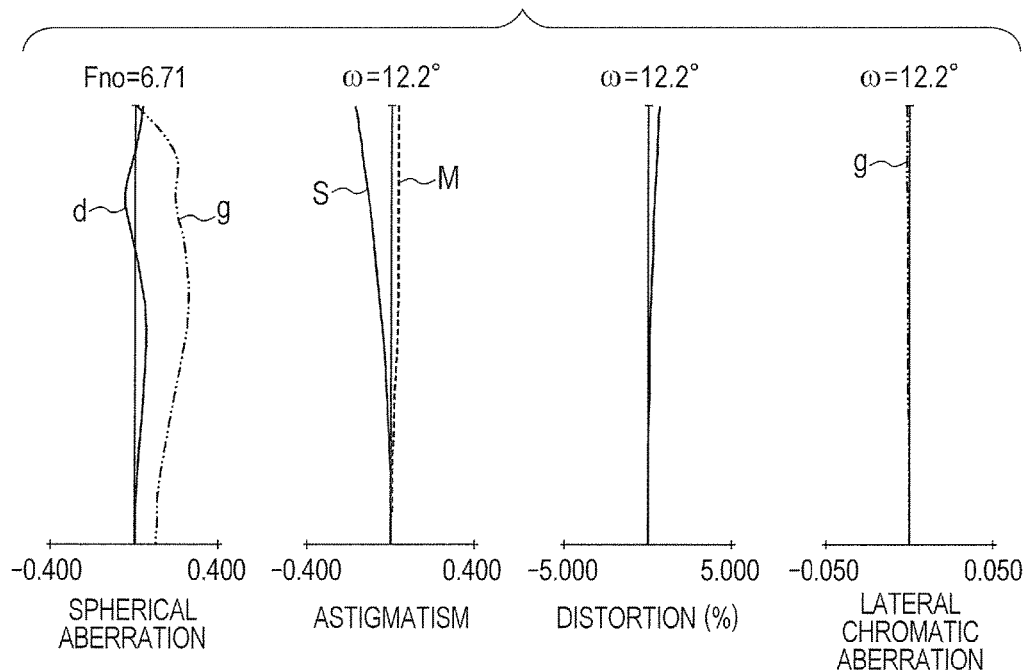
FIG. 14B is a longitudinal aberration diagram of Embodiment 5 of the present invention at a telephoto end when focused at infinity.
Figure 15A:
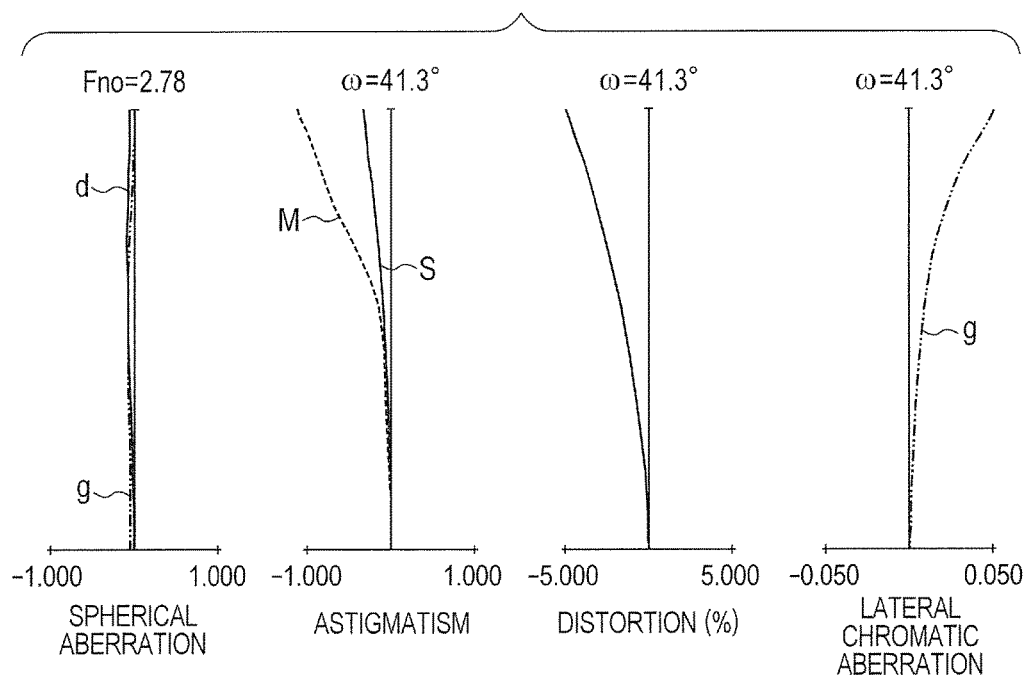
FIG. 15A is a longitudinal aberration diagram of Embodiment 5 of the present invention at the wide angle end when focused at proximity.
Figure 15B:
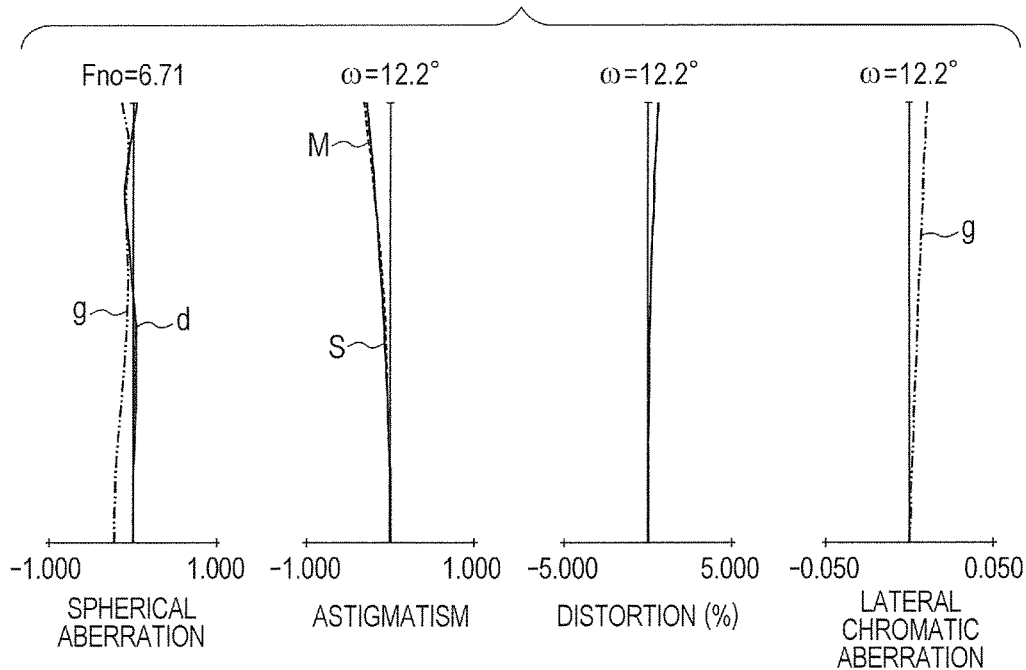
FIG. 15B is a longitudinal aberration diagram of Embodiment 5 of the present invention at the telephoto end when focused at proximity.

FIG. 13 is a lens cross-sectional view of Embodiment 5 of the present invention at a wide angle end. FIG. 14A and FIG. 14B are aberration diagrams of Embodiment 5 at the wide angle end and a telephoto end, respectively, when focused at infinity. FIG. 15A and FIG. 15B are aberration diagrams of Embodiment 5 at the wide angle end and the telephoto end, respectively, when focused at proximity. Embodiment 5 relates to a zoom lens having a zoom ratio of 4.07 and an F-number of from 2.78 to 6.71. The term "proximity" as used in this embodiment is 500 mm at the wide angle end and 800 mm at the telephoto end from an image plane.

Figure 16:
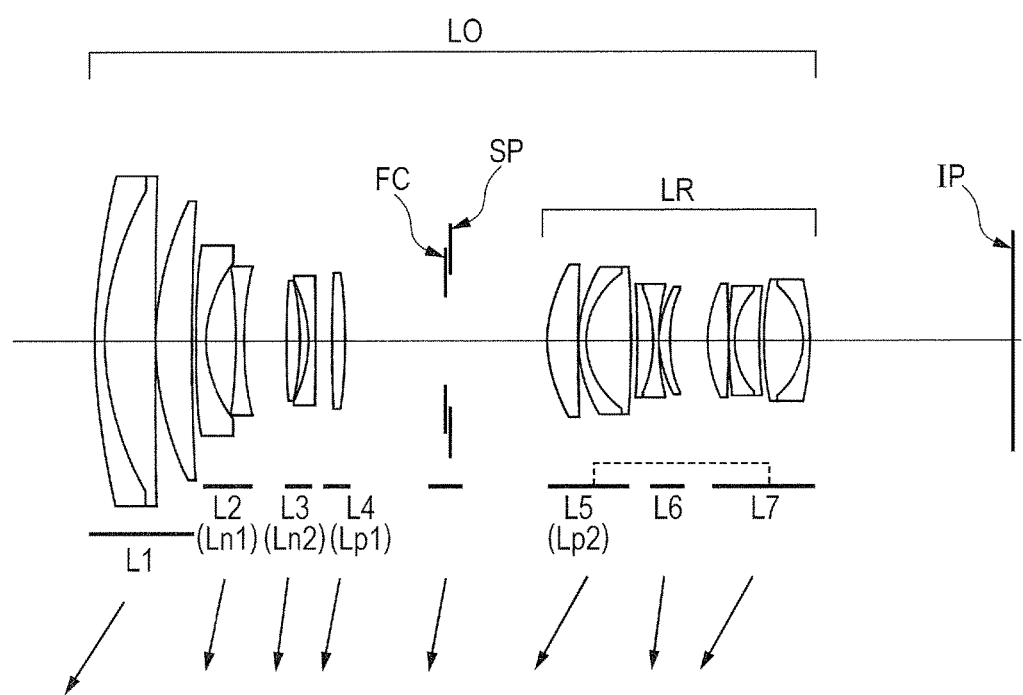
FIG. 16 is a lens cross-sectional view of Embodiment 6 of the present invention.
Figure 17A:
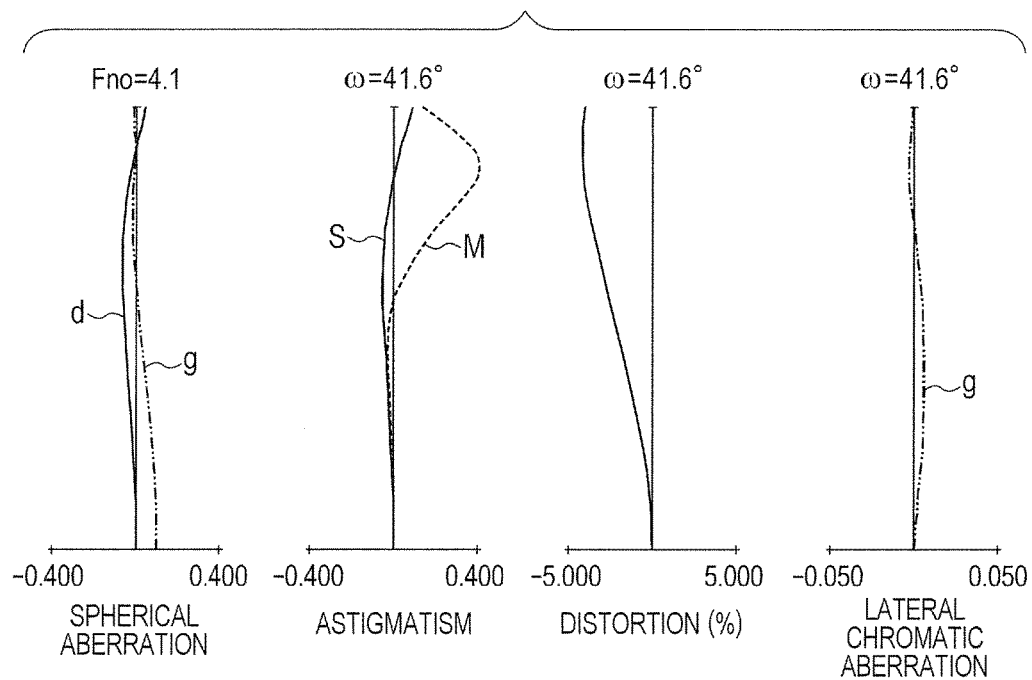
FIG. 17A is a longitudinal aberration diagram of Embodiment 6 of the present invention at a wide angle end when focused at infinity.
Figure 17B:
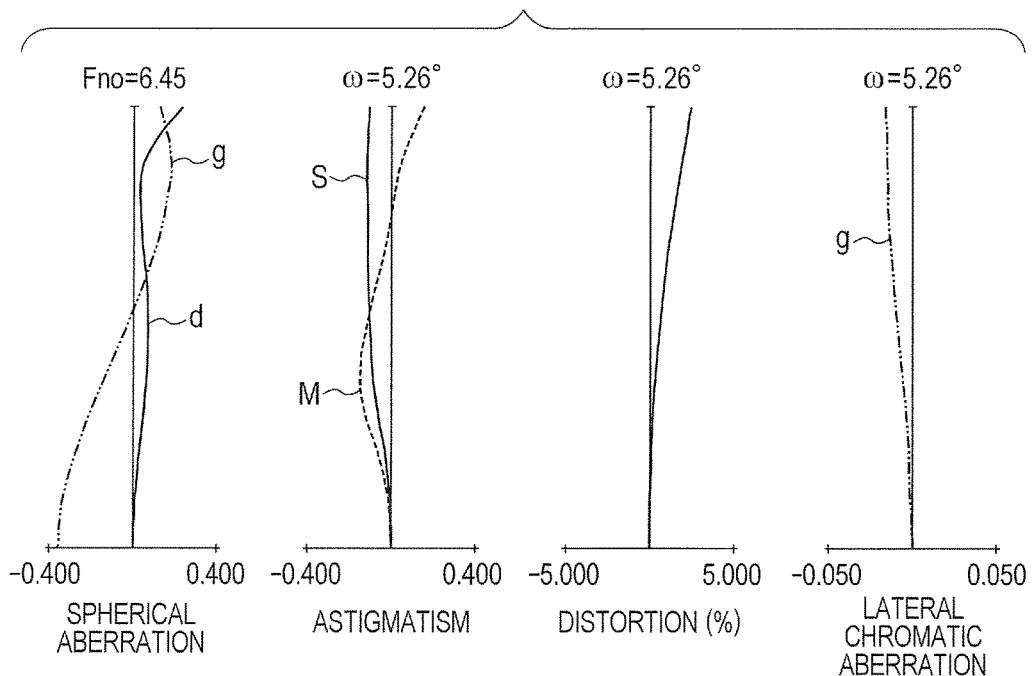
FIG. 17B is a longitudinal aberration diagram of Embodiment 6 of the present invention at a telephoto end when focused at infinity.
Figure 18A:
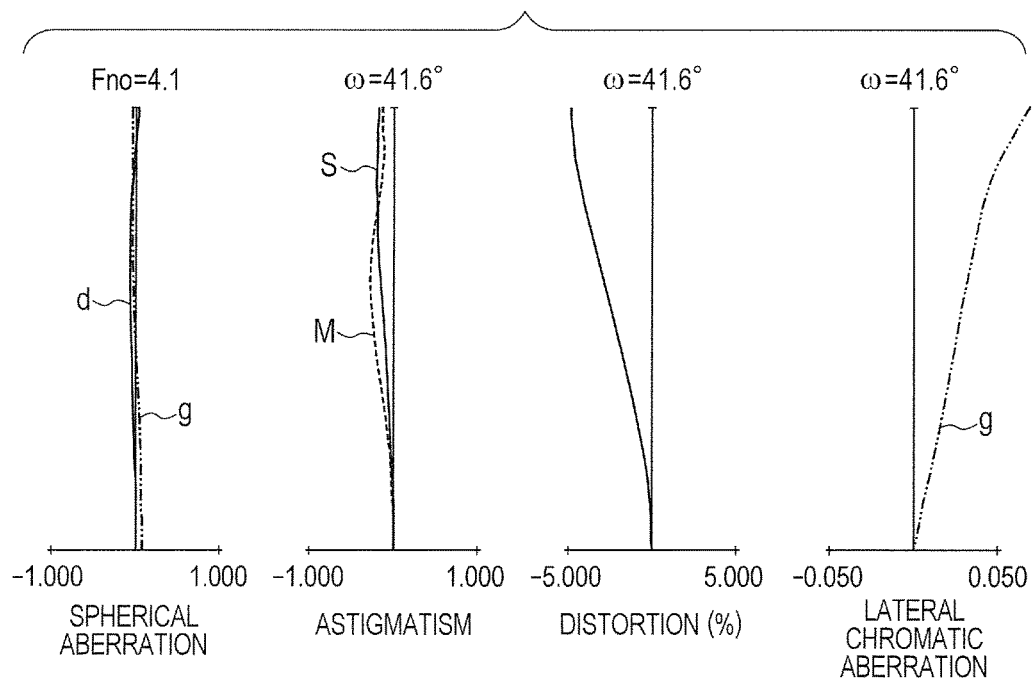
FIG. 18A is a longitudinal aberration diagram of Embodiment 6 of the present invention at the wide angle end when focused at proximity.
Figure 18B:
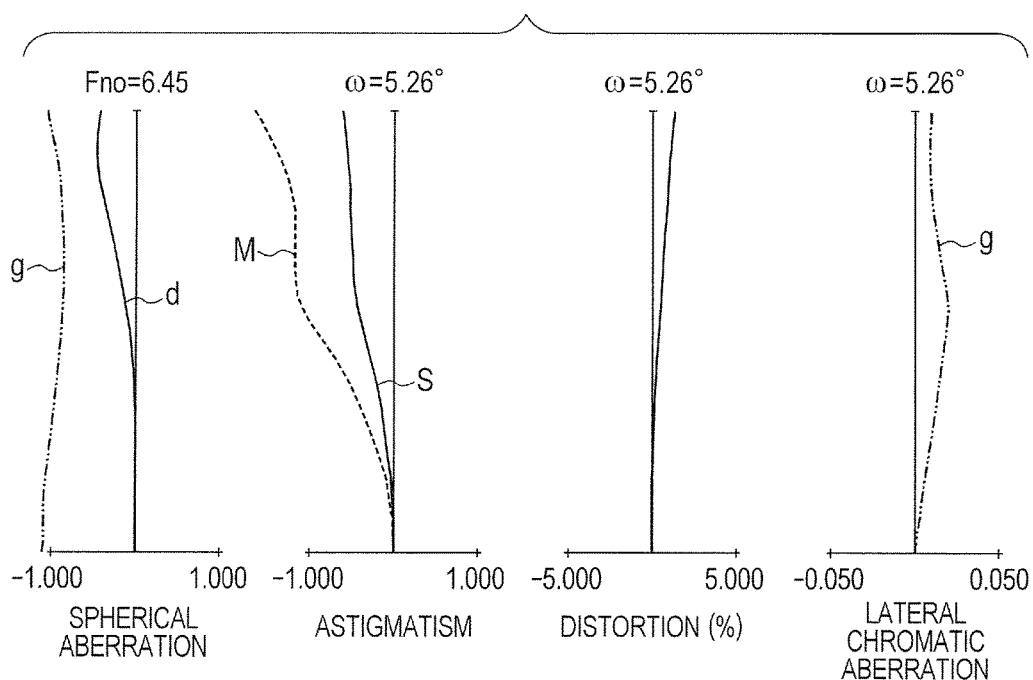
FIG. 18B is a longitudinal aberration diagram of Embodiment 6 of the present invention at the telephoto end when focused at proximity.
Figure 19:
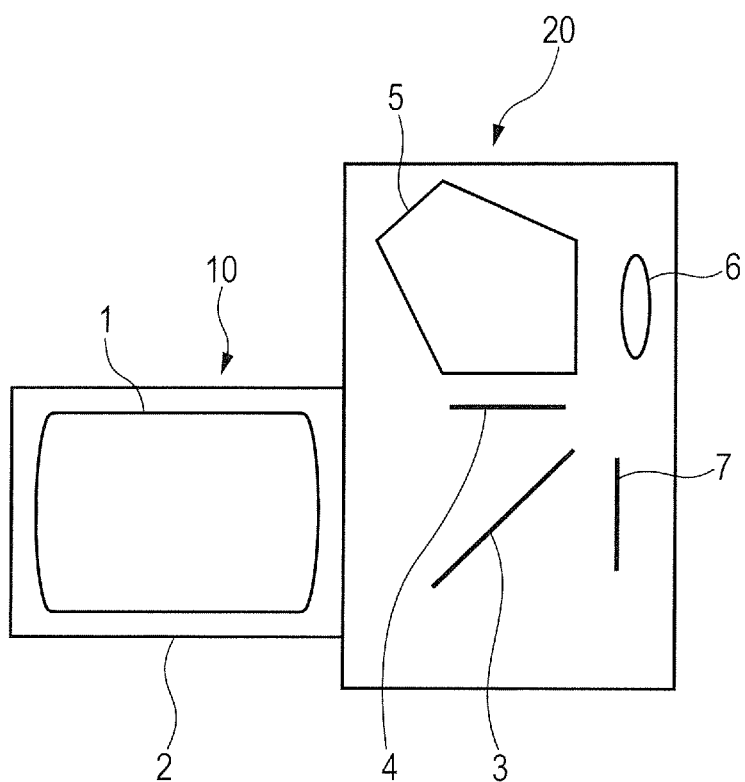
FIG. 19 is a schematic diagram of a main part of an image pickup apparatus according to the present invention.

FIG. 16 is a lens cross-sectional view of Embodiment 6 of the present invention at a wide angle end. FIG. 17A and FIG. 17B are aberration diagrams of Embodiment 6 at the wide angle end and a telephoto end, respectively, when focused at infinity. FIG. 18A and FIG. 18B are aberration diagrams of Embodiment 6 at the wide angle end and the telephoto end, respectively, when focused at proximity. Embodiment 6 relates to a zoom lens having a zoom ratio of 9.66 and an F-number of from 4.10 to 6.45. The term "proximity" as used in this embodiment is 500 mm at the wide angle end and 800 mm at the telephoto end from an image plane. FIG. 19 is a schematic diagram of a main part of an image pickup apparatus according to the present invention.

The zoom lens of each of Embodiments is an image pickup optical system used in an image pickup apparatus, e.g., a video camera, a digital camera, or a silver-halide film camera. In the lens cross-sectional views, the left side is the object side (front), and the right side is the image side (rear). Further, the zoom lens of each of Embodiments may be used in a projector. In this case, the left side is a screen side, and the right side is a projected image side. A zoom lens LO is illustrated in each of the lens cross-sectional views. Symbol i represents an order of a lens unit from the object side, and symbol Li represents an i-th lens unit.

A rear lens group LR including one or more lens units, an aperture stop SP for adjusting an amount of light, and a flare cut stop (FS stop) FC having a constant aperture diameter are illustrated. A lens unit Ln1 having a negative refractive power, a lens unit Ln2 having a negative refractive power, a lens unit Lp1 having a positive refractive power, and a lens unit Lp2 having a positive refractive power are also illustrated. An image plane IP corresponds to an image pickup surface of a solid-state image pickup element (photoelectric conversion element), e.g., a CCD sensor or a CMOS sensor when the zoom lens is used as an image pickup optical system of a video camera or a digital still camera, and corresponds to a film surface in a case of a silver-halide film camera.

In the lens cross-sectional views, the solid line arrows indicate movement loci of the respective lens units during zooming from the wide angle end to the telephoto end when focused at infinity.

Among the aberration diagrams, in the spherical aberration diagram, the solid line d and the chain double-dashed line g indicate a d-line and a g-line, respectively. In the astigmatism diagram, the broken line M and the solid line S indicate a meridional image plane and a sagittal image plane on the d-line, respectively. Further, in the diagrams illustrating distortion, the distortion is indicated by the d-line. A lateral chromatic aberration is indicated by the g-line. Symbol Fno represents an F-number, and symbol ω represents a half angle of field. In embodiments described below, the wide angle end and the telephoto end respectively refer to zoom positions when a magnification-varying lens unit is located at both ends of a mechanically movable range thereof on an optical axis.

In Embodiment 1, a lens unit L1 having a positive refractive power is arranged on the object side of the lens unit Ln1, and the rear lens group LR consists of a lens unit L5 having a positive refractive power, a lens unit L6 having a weak negative refractive power, and a lens unit L7 having a negative refractive power, which are arranged in order from the object side to the image side. The lens unit L5 has the strongest refractive power among lens units having positive refractive powers.

In Embodiment 2, a lens unit L1 having a positive refractive power is arranged on the object side of the lens unit Ln1, and the rear lens group LR consists of a lens unit L5 having a positive refractive power, a lens unit L6 having a negative refractive power, and a lens unit L7 having a positive refractive power, which are arranged in order from the object side to the image side. The lens unit L5 has the strongest refractive power among lens units having positive refractive powers.

In Embodiment 3, a lens unit L1 having a positive refractive power is arranged on the object side of the lens unit Ln1, and the rear lens group LR consists of a lens unit L5 having a positive refractive power, a lens unit L6 having a positive refractive power, a lens unit L7 having a negative refractive power, and a lens unit L8 having a weak negative refractive power, which are arranged in order from the object side to the image side. The lens unit L6 has the strongest refractive power among lens units having positive refractive powers.

In Embodiment 4, a lens unit L1 having a positive refractive power is arranged on the object side of the lens unit Ln1, and the rear lens group LR consists of a lens unit L5 having a positive refractive power and a lens unit L6 having a positive refractive power, which are arranged in order from the object side to the image side. The lens unit L6 has the strongest refractive power among lens units having positive refractive powers.

In Embodiment 5, the rear lens group LR consists of a lens unit L4 having a positive refractive power, a lens unit L5 having a positive refractive power, a lens unit L6 having a negative refractive power, and a lens unit L7 having a positive refractive power, which are arranged in order from the object side to the image side. The lens unit L5 has the strongest refractive power among lens units having positive refractive powers. The number of lens units, signs of refractive powers of the respective lens units, and the like in Embodiment 6 are the same as in Embodiment 1.

Next, features of the zoom lens according to each of Embodiments of the present invention are described. First, factors that cause an image magnification change during focusing in the zoom lens are described. A lens unit configured to move on the optical axis during focusing is hereinafter referred to as a "focusing lens unit". As functions of a movement amount d of the focusing lens unit during focusing, a focal length, a distortion, and a position of the image plane are represented by f(d), dist(d), and sk(d), respectively.

The image magnification change occurs when any one of ratios of each of a differential amount f'(d) of the focal length and a differential amount dist'(d) of the distortion to a differential amount sk'(d) of the position of the image plane:

$$f'(d)/sk'(d); \text{ and}$$

$$\text{dist}'(d)/sk'(d)$$

is high. In the expressions, sk'(d) represents focus sensitivity (a movement amount of the image plane per unit movement of the focusing lens unit).

In general, in designing the zoom lens, as the focus sensitivity becomes higher, a driving amount of the focusing lens unit may become smaller, and hence it is advantageous in downsizing the entire system. However, when the focus sensitivity is too high, it is difficult to perform focusing control with high accuracy, and hence in general, an upper limit of the focus sensitivity is determined by stopping accuracy of an actuator. Therefore, an amount of the image magnification change of the focusing lens unit is determined by any one of the differential amount f'(d) and the differential amount dist'(d).

Here, the differential amount dist'(d) is easy to reduce with design items, such as arranging an aspherical surface at a position at which a height ha of incidence of an off-axial principal ray is high. Therefore, the main factor of the amount of the image magnification change is the differential amount f'(d), which is determined by power arrangement (refractive power arrangement) of the optical system. Here, the zoom lens with a small image magnification change in Japanese Patent Application Laid-Open No. 2015-72499, the zoom lens with a relatively large image magnification change in Japanese Patent Application Laid-Open No. 2013-011914, and the zoom lens employing variator focusing (focusing by a magnification-varying lens unit) with a large image magnification change in Japanese Patent Application Laid-Open No. 2006-227526 are taken as examples. At this time, when differential amounts f'(d) of those zoom lenses are compared to each other, the relationship of 1:4:5 is established. In other words, the above-mentioned hypothesis is proven.

Next, a difference in refractive power arrangement, which leads to a difference in differential amounts f'(d), among those zoom lenses is analyzed. As described above, it has been found that those three zoom lenses are significantly different from each other in refractive power (power) of the focusing lens unit even with a small difference in focusing sensitivity. The zoom lens of Japanese Patent Application Laid-Open No. 2015-72499 is the weakest, the zoom lens of Japanese Patent Application Laid-Open No. 2013-011914 is the second weakest, and the zoom lens of Japanese Patent Application Laid-Open No. 2006-227526 is the third weakest. It has been revealed that this order corresponds to the order of amount of the image magnification change. It is apparent that, when a lens unit having a strong refractive power and a lens unit having a weak refractive power are moved by the same amount, the lens having the strong refractive power naturally has a bigger change (differential amount) f'(d) in focal length.

When the reason why the same level of focus sensitivity sk'(d) is obtained with the significantly different refractive powers of the focusing lens units is found, a mechanism that causes the image magnification change is found. In the present invention, attention is focused on a convergent state of a light beam before and after passing through the focusing lens unit (object side and image side of the focusing lens unit). In Japanese Patent Application Laid-Open No. 2015-72499, a light beam that enters the focusing lens unit in a driving direction for focusing is significantly converged. In each of Japanese Patent Application Laid-Open No. 2013-011914 and Japanese Patent Application Laid-Open No 2006-227526, a light beam that enters the focusing lens unit in a driving direction for focusing is a mildly converged light beam.

In the case where the light beam is converged in the driving direction for focusing, when the focusing lens unit is moved, a height h of incidence of an axial ray is changed significantly in a direction of being reduced. Thus, the image pickup magnification of the lens unit may be easily changed even with a weak refractive power. In a case where the light beam is close to a focal in the driving direction, the height h of incidence of the axial ray is not changed, and accordingly there is a need to change the image pickup magnification of the lens unit with a strong refractive power. This is the reason why the focus sensitivity sk'(d) at the same level is obtained with the significantly different refractive powers of the focusing lens units.

It can be seen from the above that, in order to reduce the image magnification change, it is important to arrange the focusing lens unit in the light beam that is strongly converged in the driving direction. In order to arrange the focusing lens unit in the strongly converged light beam, there is known the method in which the focusing lens unit is arranged near the image side as in Japanese Patent Application Laid-Open No. 2015-72499, but with the method, the entire system is increased in size as described above.

In view of the above, in contrast to the related art, the inventor(s) of the present invention has(have) focused attention on a point at which the height h of incidence of the axial light beam is significantly changed with a strong negative refractive power near a magnification-varying lens unit on the object side. When a wide angle end of a four-unit zoom lens including, in order from an object side, a first lens unit to a fourth lens unit having positive, negative, positive, and positive refractive powers, respectively, is taken as an example, the light beam is mildly converged from the third lens unit to the second lens unit on the object side. A lens unit Lp1 having a positive refractive power is arranged in the mildly converged light beam to strongly converge the light beam on the object side. It has been found that, when a lens unit Ln2 having a negative refractive power is arranged on the object side of the lens unit Lp1, the focusing lens unit may have a small image magnification change with a weak refractive power.

A lens unit Ln1 having a strong negative refractive power is further arranged on the object side of the lens unit Ln2 to impart the refractive power of the original magnification-varying lens unit. Here, the lens unit Ln2 and the lens unit Ln1 are brought as close as possible to each other after driving the lens unit Ln2 for focusing to downsize the entire system, and the lens unit Lp1 is also brought to the lens unit Ln2 as close as possible when the lens unit Ln2 is focused at infinity. As a result, not only the entire system is downsized, but also the converging refractive power of the lens unit Lp1 may be obtained effectively.

With the above-mentioned design, the three lens units: the lens unit Ln1, the lens unit Ln2, and the lens unit Lp1 are combined to obtain a refractive power arrangement as that of the second lens unit of the original four-unit zoom lens including the first lens unit to the fourth lens unit having positive, negative, positive, and positive refractive powers, respectively. In other words, the zoom lens according to the present invention results in a configuration in which the middle lens unit of three lens units having negative, negative, and positive refractive powers, respectively, which are obtained by dividing the magnification-varying lens unit, is used for focusing. In general, decentering sensitivity of respective lenses in the magnification-varying lens unit is very high. Thus, when those lenses are divided into separate lens units, manufacturing becomes difficult.

To address this problem, in the present invention, an interval between the lens unit Ln1 and the lens unit Lp1 is unchanged during zooming. In other words, the present invention adopts a mechanism in which the lens unit Ln1 and the lens unit Lp1 are configured to move integrally (along the same locus), and in which the lens unit Ln2 is configured to be driven for focusing between the lens unit Ln1 and the lens unit Lp1, to thereby facilitate manufacturing of the respective lens units.

It has hitherto been known to divide a magnification-varying lens unit into two lens units: a lens unit having a negative refractive power and a lens unit having a negative refractive power, and to use the lens unit on the image side for focusing. In this focusing method, the lens unit Lp1 is not provided, and hence a degree of convergence of a light beam that enters the focusing lens unit is low, and an image magnification change is large. When the negative refractive power of the magnification-varying lens unit is divided substantially equally, the negative refractive power of the focusing lens unit becomes much stronger.

Therefore, the arrangement in which the focusing lens unit is arranged to be separated toward the image side by a driving amount for focusing has the following tendency. Specifically, a principal point of the magnification-varying lens unit, which is obtained by combining the two lens units having negative refractive powers, is moved significantly toward the image side, with the result that it becomes difficult to downsize the entire system and increase an angle of field. In contrast, in the present invention, the lens unit Lp1 having the positive refractive power is provided, with the result that a principal point of the magnification-varying lens unit, which is obtained by combining the three lens units, may be arranged significantly on the object side, and that the downsizing of the entire system and the increase in angle of field are facilitated.

Next, a zoom lens employing variator focusing, in which a second lens unit having a negative refractive power for varying a magnification is used for focusing as in Japanese Patent Application Laid-Open No. 2006-227526 and the zoom lens according to the present invention are compared to each other. In the zoom lens according to the present invention, the magnification-varying lens unit is increased in thickness by an amount of driving the lens unit Ln2, but an interval between the first lens unit having the positive refractive power and the lens unit Ln1 may be reduced significantly because the interval is unchanged during driving for focusing to the contrary. As a result, the downsizing of the entire system and the increase in angle of field are facilitated.

As a result, a zoom lens, which has a small image magnification change and is driven silently, may be easily obtained with a substantially equal size as the general zoom lens in which the magnification-varying lens unit is divided into two, and in which one of the two lens units is used for focusing.

For the reasons described above, the zoom lens according to an exemplary embodiment of the present invention adopts a configuration including, in order from an object side to an image side: a lens unit Ln1 having a negative refractive power; a lens unit Ln2 having a negative refractive power; a lens unit Lp1 having a positive refractive power; and a rear lens group including one or more lens units. In addition, it is preferred that an interval between the lens unit Ln1 and the lens unit Lp1 be constant during zooming, and that the lens unit Ln2 be configured to move toward the object side during focusing from infinity to proximity.

Next, more preferred configurations in embodying the present invention are described. It is preferred that the rear lens group LR include a lens unit Lp2 having a positive refractive power, which has the shortest focal length among lens units having positive refractive powers included in the zoom lens, and that an interval between the lens unit Lp1 and the lens unit Lp2 be smaller at a telephoto end than at a wide angle end. As a result, a lens unit interval between the lens unit Ln1 and the lens unit Lp2 is reduced, and hence the magnification may be varied effectively.

In each of Embodiments, it is preferred to satisfy one or more of conditional expressions provided below. An image pickup magnification of the lens unit Ln2 at the wide angle end is represented by $\beta Ln2w$, and an image pickup magnification of the lens unit Ln2 at the telephoto end is represented by $\beta Ln2t$. An image pickup magnification of the lens unit Lp1 at the wide angle end is represented by $\beta Lp1w$. An image pickup magnification of the lens unit Lp1 at the telephoto end is represented by $\beta Lp1t$.

A focal length of the lens unit Ln2 is represented by fLn2, and a focal length of the lens unit Lp1 is represented by fLp1. A focal length of the lens unit Ln1 is represented by fLn1. A focal length of the lens unit L1 is represented by fL1, and a focal length of the entire system at the wide angle end is represented by fw. A focal length of the lens unit Lp2 is represented by fLp2, and an interval between the lens unit Ln2 and the lens unit Lp1 at the wide angle end is represented by dnpw. At this time, it is preferred to satisfy one or more of the following conditional expressions.

$$0.0 < \beta Ln2w < 1.0 \quad (1)$$

$$0.0 < \beta Ln2t < 1.0 \quad (2)$$

$$1.1 < \beta Lp1w < 5.0 \quad (3)$$

$$1.1 < \beta Lp1t < 5.0 \quad (4)$$

$$1.0 < -fLn2/fLp1 < 2.5 \quad (5)$$

$$2.0 < fLn2/fLn1 < 20.0 \quad (6)$$

$$2.0 < fL1/fw < 7.0 \quad (7)$$

$$0.4 < -fLn1/fw < 1.5 \quad (8)$$

$$2.0 < -fLn2/fw < 13.5 \quad (9)$$

$$2.0 < fLp1/fw < 8.0 \quad (10)$$

$$0.8 < fLp2/fw < 3.0 \quad (11)$$

$$0.01 < dnpw/fw < 1.00 \quad (12)$$

Next, technical meanings of the above-mentioned conditional expressions and preferred lens configurations of the respective lens units of the zoom lens are described.

The conditional expressions (1) and (2) are intended to effectively perform focusing with the lens unit Ln2. When $\beta Ln2w$ and $\beta Ln2t$ exceed the upper limit values of the conditional expressions (1) and (2), respectively, the lens unit Ln2 is moved not in the converging light beam while being moved from the image side to the object side, with the result that the image magnification change is disadvantageously increased. When $\beta Ln2w$ and $\beta Ln2t$ fall below the lower limit values of the conditional expressions (1) and (2), respectively, it means that the lens unit Ln2 is moved in a diverging light beam while being moved from the image side to the object side. As a result, the refractive power of the focus lens unit is too strong, and driving with high accuracy becomes disadvantageously difficult.

The conditional expressions (3) and (4) are intended to effectively converge the light beam from the lens unit Lp1 to the object side with the positive refractive power of the lens unit Lp1, and to reduce the image magnification change caused by the focusing by the lens unit Ln2. When $\beta Lp1w$ and $\beta Lp1t$ exceed the upper limit values of the conditional expressions (3) and (4), respectively, the positive refractive power of the lens unit Lp1 is too strong, and the negative refractive power of the magnification-varying lens unit, which is obtained by combining the lens unit Ln1, the lens unit Ln2, and the lens unit Lp1, is disadvantageously reduced.

When $\beta Lp1w$ and $\beta Lp1t$ fall below the lower limit values of the conditional expressions (3) and (4), respectively, the positive refractive power of the lens unit Lp1 is too weak, with the result that the property of converging the light beam on the object side is reduced, and that the image magnification change caused by the focusing by the lens unit Ln2 is disadvantageously increased.

The conditional expression (5) relates to a ratio between the refractive power of the lens unit Ln2 and the refractive power of the lens unit Lp1, and is intended to reduce the image magnification change caused by the focusing while appropriately setting the focus sensitivity. When the ratio exceeds the upper limit value of the conditional expression (5), the negative refractive power of the lens unit Ln2 is too weak. As a result, the focus sensitivity is reduced, and the driving amount for focusing is increased during focusing, with the result that the entire system is disadvantageously increased in size. When the ratio falls below the lower limit value of the conditional expression (5), the positive refractive power of the lens unit Lp1 is too weak, and the image magnification change is disadvantageously increased.

The conditional expression (6) relates to a ratio between the refractive power of the lens unit Ln1 and the refractive power of the lens unit Ln2, and is intended to increase the angle of field, and further to appropriately set the focus sensitivity while downsizing the entire system. When the ratio exceeds the upper limit value of the conditional expression (6), the negative refractive power of the lens unit Ln2 is too weak. As a result, the focus sensitivity is reduced, and the driving amount for focusing is increased during focusing, with the result that the entire system is disadvantageously increased in size. When the ratio falls below the lower limit value of the conditional expression (6), the negative refractive power of the lens unit Ln2 is too strong, and a position of a negative principal point of the magnification-varying lens unit is moved toward the image side. As a result, it becomes difficult to increase the angle of field while downsizing the entire system.

The zoom lens according to the present invention may be a negative-lead type zoom lens, in which a lens unit having a negative refractive power is arranged closest to the object side, or a positive-lead type zoom lens, in which a lens unit having a positive refractive power is arranged closest to the object side. The negative-lead type zoom lens is easy to increase the angle of field.

Meanwhile, in the positive-lead type zoom lens, the light beam is converged by the first lens unit having the positive refractive power to reduce sizes of lens units having negative refractive powers, and focusing with silent driving is facilitated. It is preferred to adopt a lens configuration including a lens unit L1 having a positive refractive power closest to the object side, in which, during zooming from a wide angle end to a telephoto end, an interval between the lens unit L1 and the lens unit Ln1 is increased. Moreover, when the lens unit L1 is moved toward the object side during zooming from the wide angle end to the telephoto end, the entire length of the zoom lens at the wide angle end is reduced, and the downsizing of the entire system is facilitated.

The conditional expression (7) sets a preferred range of the focal length of the lens unit L1 at such time. The conditional expression (7) is intended to appropriately set the focal length of the lens unit L1, to thereby reduce a variation in spherical aberration accompanying zooming while downsizing the entire system. When the ratio exceeds the upper limit value of the conditional expression (7), the positive refractive power of the lens unit L1 is too weak, and the entire system is disadvantageously increased in size. When the ratio falls below the lower limit value of the conditional expression (7), the positive refractive power of the lens unit L1 is too strong, and the variation in spherical aberration accompanying zooming is disadvantageously increased.

The conditional expression (8) is intended to appropriately set the negative refractive power of the lens unit Ln1, which accounts for most of the negative refractive power of the magnification-varying lens unit, to thereby satisfactorily correct variations in spherical aberration and field curvature accompanying zooming while downsizing the entire system and increasing the angle of field. When the ratio exceeds the upper limit value of the conditional expression (8), the negative refractive power of the lens unit Ln1 is too weak, and the entire system is disadvantageously increased in size. When the ratio falls below the lower limit value of the conditional expression (8), the negative refractive power of the lens unit Ln1 is too strong, and the variations in spherical aberration and field curvature accompanying zooming are disadvantageously increased.

The conditional expression (9) is intended to appropriately set the negative refractive power of the focusing lens unit (lens unit Ln2), to thereby downsize the entire system and increase the angle of field while appropriately setting the focus sensitivity. When the ratio exceeds the upper limit value of the conditional expression (9), the negative refractive power of the focusing lens unit is too weak. As a result, the driving amount for focusing is increased, and the entire system is disadvantageously increased in size. When the ratio falls below the lower limit value of the conditional expression (9), the negative refractive power of the focusing lens unit is too strong, and focusing control becomes difficult. In addition, a position of the principal point of the magnification-varying lens unit is moved toward the image side, and it becomes difficult to downsize the entire system and increase the angle of field.

The conditional expression (10) is intended to appropriately set the positive refractive power of the lens unit Lp1, to thereby downsize the entire system and increase the angle of field while reducing the image magnification change in the lens unit Ln2. When the ratio exceeds the upper limit value of the conditional expression (10), the positive refractive power of the lens unit Lp1 is too weak. As a result, the property of the lens unit Ln2 of converging the light beam from the image side to the object side is reduced, and the image magnification change is disadvantageously increased. When the ratio falls below the lower limit value of the conditional expression (10), the positive refractive power of the lens unit Lp1 is too strong. As a result, the negative refractive power of the magnification-varying lens unit is reduced, and it becomes difficult to downsize the entire system and increase the angle of field.

The conditional expression (11) is intended to appropriately set the positive refractive power of the lens unit Lp2, to thereby reduce the variation in spherical aberration accompanying zooming while downsizing the entire system. When the ratio exceeds the upper limit value of the conditional expression (11), the positive refractive power of the lens unit Lp2 is too weak, and the entire system is disadvantageously increased in size. When the ratio falls below the lower limit value of the conditional expression (11), the positive refractive power of the lens unit Lp2 is too strong, and the variation in spherical aberration accompanying zooming is disadvantageously increased.

The conditional expression (12) is intended to reduce the interval between the lens unit Lp1 and the lens unit Ln2 at the wide angle end as much as possible, and to facilitate arrangement of the lens unit Ln2 in the converging light beam, to thereby reduce the image magnification change. When the ratio exceeds the upper limit value of the conditional expression (12), the interval between the lens unit Lp1 and the lens unit Ln2 is too large, and it becomes disadvantageously difficult for the lens unit Lp1 to strongly converge the light beam. When the ratio falls below the lower limit value of the conditional expression (12), the interval between the lens unit Lp1 and the lens unit Ln2 is too small, and there is a fear that lenses disadvantageously interfere with each other due to hysteresis caused by motor driving.

It is preferred that the numerical ranges of the conditional expressions (1) to (12) be set as follows.

$$0.5 < \beta Ln2w < 0.9 \quad (1a)$$

$$0.5 < \beta Ln2t < 0.9 \quad (2a)$$

$$1.2 < \beta Lp1w < 2.0 \quad (3a)$$

$$1.2 < \beta Lp1t < 2.0 \quad (4a)$$

$$1.2 < -fLn2/fLp1 < 2.0 \quad (5a)$$

$$4.0 < fLn2/fLn1 < 15.0 \quad (6a)$$

$$3.5 < fL1/fw < 6.0 \quad (7a)$$

$$0.50 < -fLn1/fw < 1.35 \quad (8a)$$

$$3.0 < -fLn2/fw < 12.5 \quad (9a)$$

$$2.5 < fLp1/fw < 7.0 \quad (10a)$$

$$1.0 < fLp2/fw < 2.5 \quad (11a)$$

$$0.02 < dnpw/fw < 0.80 \quad (12a)$$

It is preferred that the lens unit Ln1 include two or more negative lenses. The lens unit Ln1 accounts for most of the negative refractive power of the magnification-varying lens unit. Therefore, it is preferred that the lens unit Ln1 include two or more negative lenses to distribute the negative refractive powers. It is preferred that the lens unit Ln2 include one or more negative lenses and one or more positive lenses. The lens unit Ln2 is a lens unit having a negative refractive power. Therefore, it is preferred that the lens unit Ln2 include one or more negative lenses, and further include one or more positive lenses to mainly correct a variation in spherical aberration at the telephoto end and a variation in image plane at the wide angle end while being driven for focusing.

Particularly in order to reduce the size and weight of the lens unit Ln2, which is the focusing lens unit, it is more preferred that the lens unit Ln2 consist of two or less negative lenses and one positive lens. It is further preferred that the lens unit Ln2 consist of one negative lens and one positive lens. It is preferred to adopt a zooming method in which the interval between the lens unit Ln1 and the lens unit Ln2 is larger at the telephoto end than at the wide angle end. With such a zooming method, the lens unit Ln2 is arranged on the object side at the wide angle end to facilitate the increase in angle of field, and the interval between the lens unit Ln2 and the lens unit Lp1 is reduced toward a zoom position at the telephoto end to satisfactorily obtain the magnification-varying effect.

Next, a lens configuration in each of Embodiments is described. The zoom lens according to Embodiment 1 consists of the following lens units, which are arranged in order from the object side to the image side: a first lens unit L1 having a positive refractive power, a second lens unit L2 having a negative refractive power, a third lens unit L3 having a negative refractive power, a fourth lens unit L4 having a positive refractive power, a fifth lens unit L5 having a positive refractive power, a sixth lens unit L6 having a negative refractive power, and a seventh lens unit L7 having a weak negative refractive power. Embodiment 1 relates to a seven-unit zoom lens having a zoom ratio of 9.7.

The second lens unit L2 corresponds to the lens unit Ln1 having the negative refractive power, and the third lens unit L3 corresponds to the lens unit Ln2 having the negative refractive power. Further, the fourth lens unit L4 corresponds to the lens unit Lp1 having the positive refractive power, and the fifth lens unit L5 corresponds to the lens unit Lp2 having the positive refractive power. The focusing from infinity to proximity is performed by moving the third lens unit L3 toward the object side. The third lens unit L3 consists of one negative lens and one positive lens to have a small and light lens configuration, to thereby facilitate silent driving during focusing. Moreover, the second lens unit L2 consists of two negative lenses, and holds most of the negative refractive power of the magnification-varying lens unit.

An interval between the first lens unit L1 and the second lens unit L2 is larger, an interval between the second lens unit L2 and the third lens unit L3 is larger, and an interval between the third lens unit L3 and the fourth lens unit L4 is smaller at the telephoto end than at the wide angle end. Further, zooming is performed so that an interval between the fourth lens unit L4 and the fifth lens unit L5 becomes smaller, an interval between the fifth lens unit L5 and the sixth lens unit L6 becomes larger, and an interval between the sixth lens unit L6 and the seventh lens unit L7 becomes smaller. Moreover, an interval between the second lens unit L2 and the fourth lens unit L4 and an interval between the fifth lens unit L5 and the seventh lens unit L7 are constant during zooming to reduce degradation of optical performance due to a manufacturing error.

Relationships among the refractive powers of the second lens unit L2, the third lens unit L3, and the fourth lens unit L4 satisfy the conditional expressions (5), (6), (8), (9), and (10). Therefore, high focus sensitivity is obtained while reducing the refractive power of the focusing lens unit, with the result that the image magnification change is reduced.

Moreover, a position of a combined principal point obtained when the second lens unit L2 to the fourth lens unit L4 are regarded as the magnification-varying lens unit is moved to the object side as much as possible, to thereby increase the angle of field and downsize the entire system. An image magnification of the third lens unit L3 satisfies the conditional expressions (1) and (2) at both the wide angle end and the telephoto end so that a light beam at the third lens unit L3 is converged from the image side to the object side, to thereby facilitate focusing with a small image magnification change.

Moreover, an image magnification of the fourth lens unit L4 satisfies the conditional expressions (3) and (4) at both the wide angle end and the telephoto end so that a light beam is strongly converged toward the object side of the fourth lens unit L4, to thereby obtain appropriate focus sensitivity while reducing the negative refractive power of the third lens unit L3. Moreover, the first lens unit L1 satisfies the conditional expression (7), to thereby reduce the variation in spherical aberration during zooming while downsizing the entire system. Moreover, the fifth lens unit L5 satisfies the conditional expression (11), to thereby reduce the variation in spherical aberration during zooming while downsizing the entire system.

The zoom lens according to Embodiment 2 consists of the following lens units, which are arranged in order from the object side to the image side: a first lens unit L1 having a positive refractive power, a second lens unit L2 having a negative refractive power, a third lens unit L3 having a negative refractive power, a fourth lens unit L4 having a positive refractive power, a fifth lens unit L5 having a positive refractive power, a sixth lens unit L6 having a negative refractive power, and a seventh lens unit L7 having a positive refractive power. Embodiment 2 relates to a seven-unit zoom lens having a zoom ratio of 9.7.

The second lens unit L2 corresponds to the lens unit Ln1 having the negative refractive power, and the third lens unit L3 corresponds to the lens unit Ln2 having the negative refractive power. Further, the fourth lens unit L4 corresponds to the lens unit Lp1 having the positive refractive power, and the fifth lens unit L5 corresponds to the lens unit Lp2 having the positive refractive power. The focusing from infinity to proximity is performed by moving the third lens unit L3 toward the object side.

The third lens unit L3 consists of two negative lenses and one positive lens to have a small and light lens configuration, to thereby facilitate silent driving during focusing. Moreover, the second lens unit L2 consists of two negative lenses, and holds most of the negative refractive power of the magnification-varying lens unit.

An interval between the first lens unit L1 and the second lens unit L2 is larger, an interval between the second lens unit L2 and the third lens unit L3 is larger, and an interval between the third lens unit L3 and the fourth lens unit L4 is smaller at the telephoto end than at the wide angle end. Further, zooming is performed so that an interval between the fourth lens unit L4 and the fifth lens unit L5 becomes smaller, an interval between the fifth lens unit L5 and the sixth lens unit L6 becomes larger, and an interval between the sixth lens unit L6 and the seventh lens unit L7 becomes smaller. Moreover, an interval between the second lens unit L2 and the fourth lens unit L4 and an interval between the fifth lens unit L5 and the seventh lens unit L7 are constant during zooming to reduce degradation of optical performance due to a manufacturing error.

Optical actions of the lens units in relation to the conditional expressions (1) to (12) are similar to those in Embodiment 1. The zoom lens according to Embodiment 3 consists of the following lens units, which are arranged in order from the object side to the image side: a first lens unit L1 having a positive refractive power, a second lens unit L2 having a negative refractive power, a third lens unit L3 having a negative refractive power, a fourth lens unit L4 having a positive refractive power, a fifth lens unit L5 having a positive refractive power, a sixth lens unit L6 having a positive refractive power, a seventh lens unit L7 having a negative refractive power, and an eighth lens unit L8 having a weak negative refractive power. Embodiment 3 relates to an eight-unit zoom lens having a zoom ratio of 9.5.

The second lens unit L2 corresponds to the lens unit Ln1 having the negative refractive power, and the third lens unit L3 corresponds to the lens unit Ln2 having the negative refractive power. Further, the fourth lens unit L4 corresponds to the lens unit Lp1 having the positive refractive power, and the sixth lens unit L6 corresponds to the lens unit Lp2 having the positive refractive power. The focusing from infinity to proximity is performed by moving the third lens unit L3 toward the object side. The third lens unit L3 consists of one negative lens and one positive lens to have a small and light lens configuration, to thereby facilitate silent driving during focusing.

Moreover, the second lens unit L2 consists of two negative lenses, and holds most of the negative refractive power of the magnification-varying lens unit. An interval between the first lens unit L1 and the second lens unit L2 is larger, an interval between the second lens unit L2 and the third lens unit L3 is smaller, and an interval between the third lens unit L3 and the fourth lens unit L4 is smaller at the telephoto end than at the wide angle end. Further, zooming is performed so that an interval between the fourth lens unit L4 and the fifth lens unit L5 becomes smaller, an interval between the fifth lens unit L5 and the sixth lens unit L6 is slightly changed, an interval between the sixth lens unit L6 and the seventh lens unit L7 becomes larger, and an interval between the seventh lens unit L7 and the eighth lens unit L8 becomes smaller.

Moreover, an interval between the second lens unit L2 and the fourth lens unit L4 and an interval between the sixth lens unit L6 and the eighth lens unit L8 are constant during zooming to reduce degradation of optical performance due to a manufacturing error. Embodiment 3 is different from Embodiment 1 in that the fifth lens unit L5 and the sixth lens unit L6 are separated as two lens units having positive refractive powers to reduce a variation in coma during zooming.

Optical actions of the lens units in relation to the conditional expressions (1) to (12) are similar to those in Embodiment 1. The zoom lens according to Embodiment 4 consists of the following lens units, which are arranged in order from the object side to the image side: a first lens unit L1 having a positive refractive power, a second lens unit L2 having a negative refractive power, a third lens unit L3 having a negative refractive power, a fourth lens unit L4 having a positive refractive power, a fifth lens unit L5 having a positive refractive power, and a sixth lens unit L6 having a positive refractive power. Embodiment 4 relates to a six-unit zoom lens having a zoom ratio of 8.2.

The second lens unit L2 corresponds to the lens unit Ln1 having the negative refractive power, and the third lens unit L3 corresponds to the lens unit Ln2 having the negative refractive power. Further, the fourth lens unit L4 corresponds to the lens unit Lp1 having the positive refractive power, and the sixth lens unit L6 corresponds to the lens unit Lp2 having the positive refractive power. The focusing from infinity to proximity is performed by moving the third lens unit L3 toward the object side. The third lens unit L3 consists of one negative lens and one positive lens to have a small and light lens configuration, to thereby facilitate silent driving during focusing. Moreover, the second lens unit L2 consists of two negative lenses, and holds most of the negative refractive power of the magnification-varying lens unit.

An interval between the first lens unit L1 and the second lens unit L2 is larger, an interval between the second lens unit L2 and the third lens unit L3 is larger, and an interval between the third lens unit L3 and the fourth lens unit L4 is smaller at the telephoto end than at the wide angle end. Further, zooming is performed so that an interval between the fourth lens unit L4 and the fifth lens unit L5 becomes smaller, and an interval between the fifth lens unit L5 and the sixth lens unit L6 becomes smaller. Moreover, an interval between the second lens unit L2 and the fourth lens unit L4 is constant during zooming to reduce degradation of optical performance due to a manufacturing error.

The optical action of the sixth lens unit L6 corresponding to the lens unit Lp2 is the same as in Embodiment 1. The optical actions of the lens units in relation to the conditional expressions (1) to (12) are the same as in Embodiment 1.

Embodiment 6 relates to a seven-unit zoom lens having a zoom ratio of 9.66. The second lens unit L2 corresponds to the lens unit Ln1 having the negative refractive power, and the third lens unit L3 corresponds to the lens unit Ln2 having the negative refractive power. Further, the fourth lens unit L4 corresponds to the lens unit Lp1 having the positive refractive power, and the fifth lens unit L5 corresponds to the lens unit Lp2 having the positive refractive power. The focusing from infinity to proximity is performed by moving the third lens unit L3 toward the object side. The third lens unit L3 consists of one negative lens and one positive lens to have a small and light lens configuration, to thereby facilitate silent driving during focusing. Moreover, the second lens unit L2 consists of two negative lenses, and holds most of the negative refractive power of the magnification-varying lens unit.

An interval between the first lens unit L1 and the second lens unit L2 is larger, an interval between the second lens unit L2 and the third lens unit L3 is larger, and an interval between the third lens unit L3 and the fourth lens unit L4 is smaller at the telephoto end than at the wide angle end. Further, zooming is performed so that an interval between the fourth lens unit L4 and the fifth lens unit L5 becomes smaller, an interval between the fifth lens unit L5 and the sixth lens unit L6 becomes larger, and an interval between the sixth lens unit L6 and the seventh lens unit L7 becomes smaller.

Moreover, an interval between the fifth lens unit L5 and the seventh lens unit L7 is constant during zooming to reduce degradation of optical performance due to a manufacturing error. Embodiment 6 is different from Embodiment 1 in that an interval between the second lens unit L2 and the fourth lens unit L4 is changed during zooming. The optical actions of the lens units are the same as in Embodiment 1.

Each of Embodiments 1 to 4 and 6 relates to a positive-lead type zoom lens, but the zoom lens according to the present invention is equally applicable to a negative-lead type zoom lens. Embodiment 5 is a negative-lead type zoom lens. The zoom lens according to Embodiment 5 consists of the following lens units, which are arranged in order from the object side to the image side: a first lens unit L1 having a negative refractive power, a second lens unit L2 having a negative refractive power, a third lens unit L3 having a positive refractive power, a fourth lens unit L4 having a positive refractive power, a fifth lens unit L5 having a positive refractive power, a sixth lens unit L6 having a negative refractive power, and a seventh lens unit L7 having a positive refractive power. Embodiment 5 relates to a seven-unit zoom lens having a zoom ratio of 4.1.

The first lens unit L1 corresponds to the lens unit Ln1 having the negative refractive power, and the second lens unit L2 corresponds to the lens unit Ln2 having the negative refractive power. Further, the third lens unit L3 corresponds to the lens unit Lp1 having the positive refractive power, and the fifth lens unit L5 corresponds to the lens unit Lp2 having the positive refractive power. The focusing from infinity to proximity is performed by moving the second lens unit L2 toward the object side. The second lens unit L2 consists of one negative lens and one positive lens to have a small and light lens configuration, to thereby facilitate silent driving during focusing.

Moreover, the first lens unit L1 consists of two negative lenses, and holds most of the negative refractive power of the magnification-varying lens unit. An interval between the first lens unit L1 and the second lens unit L2 is slightly changed, and an interval between the second lens unit L2 and the third lens unit L3 is slightly changed between at the telephoto end and at the wide angle end. Zooming is performed so that an interval between the third lens unit L3 and the fourth lens unit L4 becomes smaller, an interval between the fourth lens unit L4 and the fifth lens unit L5 becomes smaller, an interval between the fifth lens unit L5 and the sixth lens unit L6 becomes larger, and an interval between the sixth lens unit L6 and the seventh lens unit L7 becomes smaller.

Moreover, an interval between the first lens unit L1 and the third lens unit L3 is constant during zooming to reduce degradation of optical performance due to a manufacturing error.

Relationships among the refractive powers of the first lens unit L1, the second lens unit L2, and the third lens unit L3 satisfy the conditional expressions (5), (6), (8), (9), and (10). Therefore, high focus sensitivity is obtained while reducing the refractive power of the focusing lens unit, with the result that the image magnification change is reduced.

Moreover, a position of a combined principal point obtained when the first lens unit L1 to the third lens unit L3 are regarded as the magnification-varying lens unit is moved to the object side as much as possible, to thereby increase the angle of field and downsize the entire system. Moreover, an image magnification of the second lens unit L2 satisfies the conditional expressions (1) and (2) at both the wide angle end and the telephoto end so that a light beam at the second lens unit L2 is converged from the image side to the object side, to thereby facilitate focusing with a small image magnification change.

Moreover, an image magnification of the third lens unit L3 satisfies the conditional expressions (3) and (4) at both the wide angle end and the telephoto end so that a light beam is strongly converged toward the object side of the third lens unit L3, and appropriate focus sensitivity is obtained while reducing the negative refractive power of the second lens unit L2. Moreover, the fifth lens unit L5 satisfies the conditional expression (11) to reduce the variation in spherical aberration during zooming while downsizing the entire system.

A single-lens reflex camera (image pickup apparatus) according to the present invention illustrated in FIG. 19 is described. In FIG. 19, an image pickup apparatus including the zoom lens according to each of Embodiments 1 to 6 is illustrated. The image pickup apparatus includes an interchangeable lens barrel 10. The zoom lens 1 is held by a lens barrel 2, which is a holding member. A camera main body 20 includes a quick return mirror 3, which is configured to reflect a light beam from the zoom lens 1 upward, and a focusing plate 4, which is arranged in an image forming apparatus of the zoom lens 1. The image pickup apparatus also includes a penta roof prism (image reversing unit) 5, which is configured to convert a reverse image formed on the focusing plate 4 into an erect image, an eyepiece lens 6, which is used to observe the erect image, and other such components.

As a photosensitive plane 7, there is arranged a solid-state image pickup element (photoelectric conversion element), e.g., a CCD sensor or a CMOS sensor configured to receive the image formed by the zoom lens, or a silver-halide film. When an image is taken, the quick return mirror 3 is retracted from an optical path, and an image is formed on the photosensitive plane 7 by the zoom lens 1. The advantages described in Embodiments 1 to 6 are effectively provided to the image pickup apparatus disclosed in this embodiment.

The image pickup apparatus of the present invention can also be similarly applied to a mirrorless single-lens reflex camera which does not include a quick return mirror 3.

The optical systems according to the exemplary embodiments of the present invention are described above, but needless to say, the present invention is not limited to those embodiments, and various modifications and changes can be made thereto without departing from the gist of the present invention.

Numerical Data 1 to 6 corresponding to Embodiments 1 to 6 are shown below. In each of Numerical Data, symbol i represents the order of surfaces from the object side. In each of Numerical Data, symbol ri represents a curvature radius of the i-th lens surface counted from the object side, symbol di represents a lens thickness or an air interval between the i-th surface and an (i+1)th surface counted from the object side, and symbols ndi and vdi represent a refractive index and an Abbe number of a material between the i-th surface and the (i+1)th surface counted from the object side, respectively. Symbol BF represents a back focus. When an X axis is set in the optical axis direction, an H axis is set in a direction perpendicular to the optical axis, a travelling direction of light is defined as positive, a paraxial curvature radius is represented by R, and aspherical coefficients are represented by K, A2, A4, A6, A8, A10, and A12, an aspherical shape is given by the following equation.

$$X = \frac{(1/R)}{1 + \sqrt{1 - (1+K)(H/R)^2}} + A2 \cdot H^2 + A4 \cdot H^4 + A6 \cdot H^6 + A8 \cdot H^8 + A10 \cdot H^{10} + A12 \cdot H^{12}$$

In each of the aspherical coefficients, "e-x" means "$10^{-x}$". In addition to specifications such as the focal length and the F-number, a half angle of field and an image height of the entire system are the maximum image height that determines the half angle of field, and the total length of the zoom lens is a distance from the first lens surface to the image plane. The back focus BF indicates a length from the last lens surface to the image plane. Moreover, data on the respective lens units indicates the respective lens units and focal lengths thereof.

In addition, the part in which an interval d of each optical surface is (variable) is changed during zooming, and an interval between surfaces corresponding to the focal length is shown in an annexed table. Results of calculations of the conditional expressions based on lens data in Numerical Data 1 to 6 described below are shown in Table 1.

(Numerical Data 1)

Unit mm

Surface data

| Surface number i | ri | di | ndi | vdi | Effective diameter |
|---|---|---|---|---|---|
| 1 | 132.480 | 2.00 | 1.80440 | 39.6 | 63.34 |
| 2 | 58.479 | 9.30 | 1.49700 | 81.5 | 57.03 |
| 3 | 1004.808 | 0.15 | | | 55.31 |
| 4 | 61.378 | 7.05 | 1.59522 | 67.7 | 53.24 |
| 5 | 441.235 | (Variable) | | | 52.42 |
| 6* | 1396.081 | 1.70 | 1.85400 | 40.4 | 35.67 |
| 7* | 21.758 | 6.08 | | | 27.46 |
| 8 | −101.824 | 1.40 | 1.76385 | 48.5 | 27.36 |
| 9 | 55.563 | (Variable) | | | 25.69 |
| 10 | 136.150 | 2.50 | 1.71736 | 29.5 | 22.82 |
| 11 | −101.412 | 1.87 | | | 22.39 |
| 12 | −26.398 | 1.20 | 1.49700 | 81.5 | 22.39 |
| 13 | 1518.313 | (Variable) | | | 23.87 |
| 14 | 397.664 | 2.48 | 1.85478 | 24.8 | 24.93 |
| 15 | −90.949 | (Variable) | | | 25.37 |
| 16 | ∞ | 0.70 | | | (Variable) |
| 17 (Stop) | ∞ | (Variable) | | | 26.58 |
| 18 | 27.817 | 5.94 | 1.49700 | 81.5 | 28.74 |
| 19 | 512.488 | 0.15 | | | 28.49 |
| 20 | 27.440 | 1.40 | 1.90366 | 31.3 | 27.93 |
| 21 | 16.263 | 8.74 | 1.58313 | 59.4 | 25.59 |
| 22* | −116.763 | (Variable) | | | 24.95 |
| 23 | −180.283 | 3.03 | 1.75520 | 27.5 | 20.87 |
| 24 | −28.086 | 1.00 | 1.77250 | 49.6 | 20.56 |
| 25* | 42.446 | 0.30 | | | 19.68 |
| 26 | 21.981 | 2.00 | 1.72047 | 34.7 | 19.63 |
| 27 | 27.444 | (Variable) | | | 19.03 |
| 28 | 25.585 | 3.92 | 1.51633 | 64.1 | 20.86 |
| 29 | −1334.955 | 0.15 | | | 20.50 |
| 30 | 79.292 | 1.10 | 2.00100 | 29.1 | 20.21 |
| 31 | 15.227 | 4.87 | 1.49700 | 81.5 | 19.07 |
| 32 | 117.425 | 1.05 | | | 19.32 |
| 33 | 89.705 | 7.23 | 1.59270 | 35.3 | 19.85 |
| 34 | −13.680 | 1.20 | 1.88300 | 40.8 | 20.26 |
| 35 | −58.439 | | | | 22.38 |

Aspherical surface data

Sixth surface

K = 0.00000e+000　A4 = 1.32120e−005　A6 = −3.35744e−008
A8 = 4.30207e−011　A10 = 7.07141e−015　A12 = −2.74350e−017

Seventh surface

K = 0.00000e+000　A4 = 8.33223e−006　A6 = −5.68507e−009
A8 = −1.87147e−011　A10 = −1.56985e−013

Twenty-second surface

K = 0.00000e+000　A4 = 1.21704e−005　A6 = −1.15174e−008
A8 = −2.34645e−012　A10 = 8.04596e−014

Twenty-fifth surface

K = 0.00000e+000　A4 = −4.43903e−006　A6 = −1.20001e−009
A8 = 1.07822e−010　A10 = −7.14391e−013

Various data
Zoom ratio 9.67

| | Wide angle | Intermediate | Telephoto |
|---|---|---|---|
| Focal length | 24.30 | 99.99 | 234.98 |
| F-number | 4.10 | 6.04 | 6.40 |
| Half angle of field (degree) | 41.68 | 12.21 | 5.26 |
| Image height | 21.64 | 21.64 | 21.64 |
| Total lens length | 176.56 | 220.28 | 254.60 |
| BF | 38.70 | 85.02 | 92.03 |
| d5 | 0.90 | 31.00 | 63.15 |
| d9 | 8.14 | 4.85 | 9.80 |
| d13 | 2.45 | 5.74 | 0.80 |
| d15 | 19.93 | 1.50 | 1.50 |
| d17 | 19.40 | 5.14 | 0.30 |
| d22 | 1.15 | 6.53 | 7.65 |
| d27 | 7.35 | 1.97 | 0.85 |
| ea16 | 16.47 | 23.83 | 26.26 |

Zoom lens unit data

| Unit | First surface | Focal length | Lens structure length | Front principal point position | Rear principal point position |
|---|---|---|---|---|---|
| 1 | 1 | 115.35 | 18.50 | 5.50 | −6.46 |
| 2 | 6 | −15.30 | 9.18 | 3.08 | −4.17 |
| 3 | 10 | −159.24 | 5.57 | 8.50 | 4.13 |
| 4 | 14 | 86.80 | 2.48 | 1.09 | −0.25 |
| 5 | 16 | ∞ | 0.70 | 0.35 | −0.35 |
| 6 | 18 | 29.82 | 16.23 | 2.63 | −8.15 |
| 7 | 23 | −61.56 | 6.34 | 3.39 | −0.31 |
| 8 | 28 | −720.48 | 19.52 | 81.88 | 61.39 |

(Numerical Data 2)

Unit mm

Surface data

| Surface number i | ri | di | ndi | vdi | Effective diameter |
|---|---|---|---|---|---|
| 1 | 115.094 | 2.00 | 1.90043 | 37.4 | 62.38 |
| 2 | 61.116 | 8.71 | 1.49700 | 81.5 | 56.97 |
| 3 | 597.125 | 0.15 | | | 56.14 |
| 4 | 64.719 | 7.23 | 1.59522 | 67.7 | 54.59 |
| 5 | 521.702 | (Variable) | | | 54.22 |
| 6* | 217.632 | 1.60 | 1.85400 | 40.4 | 33.72 |
| 7* | 19.788 | 6.05 | | | 25.73 |
| 8 | −77.964 | 1.30 | 1.76385 | 48.5 | 25.50 |
| 9 | 76.533 | (Variable) | | | 23.98 |
| 10 | 96.863 | 1.15 | 1.77250 | 49.6 | 23.07 |
| 11 | 30.116 | 3.82 | 1.71736 | 29.5 | 22.00 |
| 12 | −131.948 | 2.35 | | | 21.46 |
| 13 | −22.042 | 1.10 | 1.59522 | 67.7 | 21.46 |
| 14 | −199.817 | (Variable) | | | 21.82 |
| 15 | 1534.963 | 3.07 | 1.62588 | 35.7 | 23.22 |
| 16 | −41.748 | (Variable) | | | 23.78 |
| 17 | ∞ | 0.50 | | | (Variable) |
| 18 (Stop) | ∞ | (Variable) | | | 25.25 |
| 19 | 26.038 | 5.95 | 1.49700 | 81.5 | 27.44 |
| 20 | 786.155 | 0.15 | | | 27.16 |
| 21 | 25.948 | 1.40 | 1.90366 | 31.3 | 26.58 |
| 22 | 14.855 | 8.69 | 1.58313 | 59.4 | 24.13 |
| 23* | −105.696 | (Variable) | | | 23.54 |
| 24 | −101.691 | 5.23 | 1.75520 | 27.5 | 19.60 |
| 25 | −19.948 | 1.00 | 1.77250 | 49.6 | 19.07 |
| 26* | 32.084 | 0.30 | | | 18.44 |
| 27 | 29.087 | 2.13 | 1.59551 | 39.2 | 18.71 |
| 28 | 65.081 | (Variable) | | | 18.78 |
| 29 | 44.517 | 4.00 | 1.48749 | 70.2 | 21.26 |
| 30 | −62.721 | 0.15 | | | 21.36 |
| 31 | 165.666 | 1.20 | 2.00100 | 29.1 | 21.25 |
| 32 | 15.824 | 4.22 | 1.49700 | 81.5 | 20.74 |
| 33 | 36.751 | 0.15 | | | 21.76 |
| 34 | 26.293 | 6.51 | 1.59270 | 35.3 | 23.48 |
| 35 | −41.718 | 1.86 | | | 23.95 |
| 36 | −21.634 | 1.30 | 1.88300 | 40.8 | 23.95 |
| 37 | −34.045 | | | | 25.43 |

Aspherical surface data

Sixth surface

K = 0.00000e+000   A4 = 7.65377e−006   A6 = −1.47714e−008
A8 = 4.72399e−011   A10 = −7.13337e−014   A12 = 2.79748e−017

Seventh surface

K = 0.00000e+000   A4 = 1.42514e−006   A6 = −2.40422e−009
A8 = 1.96364e−011   A10 = 2.69656e−013

Twenty-third surface

K = 0.00000e+000   A4 = 1.55967e−005   A6 = −1.39770e−008
A8 = −1.10046e−011   A10 = 1.40040e−013

Twenty-sixth surface

K = 0.00000e+000   A4 = −1.00848e−005   A6 = −3.62496e−009
A8 = 1.87692e−010   A10 = −1.41895e−012

Various data
Zoom ratio 9.67

| | Wide angle | Intermediate | Telephoto |
|---|---|---|---|
| Focal length | 24.30 | 99.94 | 234.87 |
| F-number | 4.10 | 6.00 | 6.40 |
| Half angle of field (degree) | 41.68 | 12.21 | 5.26 |
| Image height | 21.64 | 21.64 | 21.64 |
| Total lens length | 178.58 | 222.44 | 258.53 |
| BF | 38.70 | 85.15 | 91.52 |
| d5 | 0.90 | 31.69 | 65.43 |
| d9 | 1.86 | 2.92 | 6.00 |
| d14 | 4.94 | 3.88 | 0.80 |
| d16 | 18.91 | 1.50 | 1.50 |
| d18 | 20.50 | 4.54 | 0.50 |
| d23 | 1.32 | 7.69 | 8.71 |
| d28 | 8.19 | 1.81 | 0.80 |
| ea17 | 15.94 | 23.26 | 25.02 |

Zoom lens unit data

| Unit | First surface | Focal length | Lens structure length | Front principal point position | Rear principal point position |
|---|---|---|---|---|---|
| 1 | 1 | 118.54 | 18.08 | 4.66 | −6.97 |
| 2 | 6 | −15.66 | 8.95 | 2.92 | −4.24 |
| 3 | 10 | −87.68 | 8.42 | 9.47 | 3.16 |
| 4 | 15 | 64.99 | 3.07 | 1.84 | −0.05 |
| 5 | 17 | ∞ | 0.50 | 0.25 | −0.25 |
| 6 | 19 | 28.22 | 16.19 | 2.65 | −8.15 |
| 7 | 24 | −46.64 | 8.66 | 2.63 | −2.45 |
| 8 | 29 | 334.19 | 19.39 | −5.13 | −18.11 |

(Numerical Data 3)

Unit mm

Surface data

| Surface number i | ri | di | ndi | vdi | Effective diameter |
|---|---|---|---|---|---|
| 1 | 130.994 | 2.00 | 1.80440 | 39.6 | 62.69 |
| 2 | 58.583 | 9.29 | 1.49700 | 81.5 | 56.56 |
| 3 | 953.601 | 0.15 | | | 55.15 |
| 4 | 61.661 | 7.17 | 1.59522 | 67.7 | 53.83 |
| 5 | 437.699 | (Variable) | | | 53.09 |
| 6* | 654.455 | 1.70 | 1.85400 | 40.4 | 35.33 |
| 7* | 20.900 | 6.57 | | | 27.16 |
| 8 | −72.705 | 1.40 | 1.76385 | 48.5 | 26.95 |
| 9 | 78.864 | (Variable) | | | 25.61 |
| 10 | 128.499 | 2.50 | 1.71736 | 29.5 | 22.67 |
| 11 | −104.228 | 2.44 | | | 22.40 |
| 12 | −26.403 | 1.20 | 1.49700 | 81.5 | 22.08 |
| 13 | 1291.374 | (Variable) | | | 23.74 |
| 14 | 1112.240 | 2.44 | 1.85478 | 24.8 | 24.38 |
| 15 | −79.983 | (Variable) | | | 24.92 |
| 16 (Stop) | ∞ | 0.00 | | | 26.05 |
| 17 | 27.286 | 5.75 | 1.49700 | 81.5 | 27.79 |
| 18 | 380.075 | (Variable) | | | 27.55 |
| 19 | 28.137 | 1.40 | 1.90366 | 31.3 | 27.07 |
| 20 | 16.420 | 8.27 | 1.58313 | 59.4 | 24.97 |
| 21* | −130.611 | (Variable) | | | 24.39 |
| 22 | −240.099 | 3.25 | 1.75520 | 27.5 | 21.88 |
| 23 | −29.981 | 1.00 | 1.77250 | 49.6 | 21.52 |
| 24* | 46.180 | 0.30 | | | 20.77 |
| 25 | 22.564 | 1.98 | 1.72047 | 34.7 | 20.91 |
| 26 | 27.164 | (Variable) | | | 20.39 |
| 27 | 25.390 | 3.98 | 1.51633 | 64.1 | 20.39 |
| 28 | −1025.644 | 0.15 | | | 20.03 |
| 29 | 66.284 | 1.10 | 2.00100 | 29.1 | 19.75 |
| 30 | 15.290 | 4.82 | 1.49700 | 81.5 | 18.84 |
| 31 | 107.452 | 1.33 | | | 19.24 |
| 32 | 153.111 | 6.91 | 1.59270 | 35.3 | 19.72 |
| 33 | −13.749 | 1.20 | 1.88300 | 40.8 | 20.15 |
| 34 | −57.017 | | | | 22.24 |

Aspherical surface data

Sixth surface

K = 0.00000e+000   A4 = 1.10198e−005   A6 = −3.08107e−008
A8 = 5.85186e−011   A10 = −6.18886e−014   A12 = 2.71131e−017

-continued

Unit mm

Seventh surface

K = 0.00000e+000  A4 = 5.85298e−006  A6 = −1.50401e−008
A8 = 2.22480e−011  A10 = 1.68569−013

Twenty-first surface

K = 0.00000e+000  A4 = 1.21224e−005  A6 = −1.16227e−008
A8 = 1.69214e−011  A10 = 4.07401e−014

Twenty-fourth surface

K = 0.00000e+000  A4 = −3.94829e−006  A6 = 8.62162e−009
A8 = −9.21008e−012  A10 = −1.88190e−013

Various data
Zoom ratio 9.51

|  | Wide angle | Intermediate | Telephoto |
|---|---|---|---|
| Focal length | 24.60 | 100.02 | 234.00 |
| F-number | 3.43 | 6.09 | 6.50 |
| Half angle of field (degree) | 41.33 | 12.21 | 5.28 |
| Image height | 21.64 | 21.64 | 21.64 |
| Total lens length | 176.41 | 220.91 | 254.55 |
| BF | 39.21 | 85.58 | 92.15 |
| d5 | 0.90 | 30.94 | 62.94 |
| d9 | 9.70 | 5.08 | 9.61 |
| d13 | 0.71 | 5.33 | 0.80 |
| d15 | 38.37 | 6.43 | 1.50 |
| d18 | 0.51 | 0.54 | 0.54 |
| d21 | 1.14 | 6.61 | 7.85 |
| d26 | 7.56 | 2.09 | 0.85 |

Zoom lens unit data

| Unit | First surface | Focal length | Lens structure length | Front principal point position | Rear principal point position |
|---|---|---|---|---|---|
| 1 | 1 | 115.42 | 18.62 | 5.41 | −6.62 |
| 2 | 6 | −15.31 | 9.67 | 3.10 | −4.60 |
| 3 | 10 | −164.94 | 6.14 | 10.67 | 5.58 |
| 4 | 14 | 87.38 | 2.44 | 1.23 | −0.09 |
| 5 | 16 | 58.83 | 5.75 | −0.30 | −4.11 |
| 6 | 19 | 58.44 | 9.67 | 0.74 | −5.37 |
| 7 | 22 | −67.83 | 6.53 | 3.79 | −0.03 |
| 8 | 27 | −1038.25 | 19.49 | 128.69 | 102.34 |

(Numerical Data 4)

Unit mm

Surface data

| Surface number i | ri | di | ndi | vdi | Effective diameter |
|---|---|---|---|---|---|
| 1 | 119.585 | 2.00 | 1.80440 | 39.6 | 64.04 |
| 2 | 59.612 | 9.33 | 1.49700 | 81.5 | 60.09 |
| 3 | 368.173 | 0.15 |  |  | 59.26 |
| 4 | 65.779 | 7.53 | 1.59522 | 67.7 | 57.57 |
| 5 | 445.134 | (Variable) |  |  | 56.76 |
| 6* | −515.488 | 1.70 | 1.85400 | 40.4 | 36.47 |
| 7* | 21.242 | 6.61 |  |  | 27.95 |
| 8 | −95.887 | 1.40 | 1.76385 | 48.5 | 27.76 |
| 9 | 102.290 | (Variable) |  |  | 26.64 |
| 10 | 3605.550 | 2.30 | 1.71736 | 29.5 | 22.94 |
| 11 | −73.518 | 1.66 |  |  | 22.62 |
| 12 | −26.667 | 1.20 | 1.49700 | 81.5 | 22.60 |
| 13 | −210.343 | (Variable) |  |  | 23.48 |
| 14 | 373.971 | 2.36 | 1.85478 | 24.8 | 24.26 |
| 15 | −99.724 | (Variable) |  |  | 24.65 |
| 16 (Stop) | ∞ | 0.00 |  |  | 25.70 |
| 17 | 27.248 | 5.15 | 1.49700 | 81.5 | 27.21 |
| 18 | 141.864 | 0.96 |  |  | 26.89 |
| 19 | 25.043 | 1.40 | 1.90366 | 31.3 | 26.57 |
| 20 | 16.717 | 5.61 | 1.58313 | 59.4 | 24.75 |
| 21* | 40.974 | 2.49 |  |  | 24.04 |
| 22 | 142.102 | 3.19 | 1.75520 | 27.5 | 23.99 |
| 23 | −47.894 | 1.00 | 1.77250 | 49.6 | 23.87 |
| 24 | 50.376 | (Variable) |  |  | 23.50 |
| 25 | 21.934 | 5.62 | 1.51633 | 64.1 | 25.34 |
| 26 | 370.801 | 1.08 |  |  | 25.11 |
| 27 | 27.815 | 1.10 | 2.00100 | 29.1 | 24.54 |
| 28 | 15.556 | 8.30 | 1.49700 | 81.5 | 22.77 |
| 29 | −48.010 | 0.30 |  |  | 22.58 |
| 30 | −204.624 | 6.23 | 1.59270 | 35.3 | 22.05 |
| 31 | −15.654 | 1.20 | 1.88300 | 40.8 | 21.60 |
| 32* | 131.206 |  |  |  | 22.39 |

Aspherical surface data

Sixth surface

K = 0.00000e+000  A4 = 1.33977e−005  A6 = −2.89383e−008
A8 = 3.26785e−011  A10 = −8.83774e−016  A12 = 2.03321e−017

Seventh surface

K = 0.00000e+000  A4 = 5.24173e−006  A6 = 1.15011e−008
A8 = −1.06391e−010  A10 = 8.71487e−014

Twenty-first surface

K = 0.00000e+000  A4 = 1.10326e−005  A6 = 8.71569e−009
A8 = 2.12418e−012  A10 = 7.75948e−014

Thirty-second surface

K = 0.00000e+000  A4 = 1.09800e−005  A6 = −2.03435e−008
A8 = 5.05459e−010  A10 = −3.79728e−012  A12 = 1.13692e−014

Various data
Zoom ratio 8.23

|  | Wide angle | Intermediate | Telephoto |
|---|---|---|---|
| Focal length | 24.30 | 100.00 | 200.00 |
| F-number | 3.07 | 5.62 | 6.29 |
| Half angle of field (degree) | 41.68 | 12.21 | 6.17 |
| Image height | 21.64 | 21.64 | 21.64 |
| Total lens length | 171.86 | 221.11 | 254.57 |
| BF | 38.70 | 85.00 | 96.09 |
| d5 | 0.90 | 38.66 | 65.60 |
| d9 | 10.06 | 6.42 | 10.54 |
| d13 | 1.29 | 4.92 | 0.80 |
| d15 | 31.64 | 4.90 | 1.50 |
| d24 | 9.39 | 1.33 | 0.15 |

Zoom lens unit data

| Unit | First surface | Focal length | Lens structure length | Front principal point position | Rear principal point position |
|---|---|---|---|---|---|
| 1 | 1 | 126.32 | 19.01 | 4.60 | −7.68 |
| 2 | 6 | −16.14 | 9.71 | 2.64 | −5.16 |
| 3 | 10 | −165.82 | 5.16 | 5.55 | 1.68 |
| 4 | 14 | 92.32 | 2.36 | 1.01 | −0.27 |
| 5 | 16 | 73.84 | 19.81 | −16.36 | −24.43 |
| 6 | 25 | 57.98 | 23.83 | −17.36 | −25.25 |

(Numerical Data 5)

Unit mm

Surface data

| Surface number i | ri | di | ndi | vdi | Effective diameter |
|---|---|---|---|---|---|
| 1* | 101.865 | 2.70 | 1.58313 | 59.4 | 51.34 |
| 2* | 23.965 | 10.15 | | | 39.20 |
| 3 | 220.475 | 2.10 | 1.88300 | 40.8 | 39.02 |
| 4 | 60.772 | (Variable) | | | 36.83 |
| 5 | 99.973 | 3.05 | 1.65412 | 39.7 | 31.09 |
| 6 | −5281.346 | 2.41 | | | 30.37 |
| 7 | −53.787 | 1.20 | 1.49700 | 81.5 | 30.18 |
| 8 | 458.967 | (Variable) | | | 29.58 |
| 9 | 183.253 | 2.45 | 1.84666 | 23.8 | 29.40 |
| 10 | −645.519 | (Variable) | | | 29.33 |
| 11 (Stop) | ∞ | 0.00 | | | 28.71 |
| 12 | 30.678 | 6.25 | 1.49700 | 81.5 | 31.65 |
| 13 | 358.328 | (Variable) | | | 31.37 |
| 14 | 25.999 | 1.40 | 1.90366 | 31.3 | 30.60 |
| 15 | 18.568 | 9.18 | 1.58313 | 59.4 | 28.40 |
| 16* | −184.039 | (Variable) | | | 27.38 |
| 17 | −69.478 | 1.84 | 1.76182 | 26.5 | 25.24 |
| 18 | −50.604 | 1.00 | 1.74320 | 49.3 | 24.85 |
| 19* | 30.342 | (Variable) | | | 23.67 |
| 20 | 34.843 | 4.90 | 1.49700 | 81.5 | 24.18 |
| 21 | −80.065 | 0.15 | | | 24.34 |
| 22 | 88.620 | 4.87 | 1.49700 | 81.5 | 24.31 |
| 23 | −37.070 | 0.17 | | | 24.22 |
| 24 | −424.133 | 5.24 | 1.59270 | 35.3 | 23.55 |
| 25 | −22.500 | 1.20 | 1.88300 | 40.8 | 23.15 |
| 26* | 66.265 | | | | 23.35 |

Aspherical surface data

First surface

K = 0.00000e+00    A4 = 1.26758e−005    A6 = −2.97938e−008
A8 = 4.61726e−011    A10 = −3.93749e−014    A12 = 1.45888e−017

Second surface

K = 0.00000e+000    A4 = 1.11654e−005    A6 = −2.01556e−008
A8 = 2.75615e−013    A10 = 1.56083e−014

Sixteenth surface

K = 0.00000e+000    A4 = 5.98081e−006    A6 = −2.30949e−008
A8 = 7.95036e−011    A10 = −1.14679e−013

Nineteenth surface

K = 0.00000e+000    A4 = 1.68295e−006    A6 = 3.98461e−008
A8 = −1.10067e−010    A10 = 1.75347e−013

Twenty-sixth surface

K = 0.00000e+000    A4 = 1.02711e−005    A6 = −3.47587e−009
A8 = 2.64713e−011    A10 = −1.18691e−013

Various data
Zoom ratio 4.07

| | Wide angle | Intermediate | Telephoto |
|---|---|---|---|
| Focal length | 24.60 | 50.00 | 100.00 |
| F-number | 2.78 | 4.03 | 6.71 |
| Half angle of field (degree) | 41.33 | 23.40 | 12.21 |
| Image height | 21.64 | 21.64 | 21.64 |
| Total lens length | 176.57 | 166.06 | 198.50 |
| BF | 39.19 | 66.32 | 117.51 |
| d4 | 14.42 | 13.10 | 14.42 |
| d8 | 0.80 | 2.12 | 0.80 |
| d10 | 50.72 | 15.86 | 1.50 |
| d13 | 3.23 | 1.52 | 0.50 |
| d16 | 1.95 | 2.69 | 3.35 |
| d19 | 6.01 | 4.20 | 0.16 |

Unit mm

Zoom lens unit data

| Unit | First surface | Focal length | Lens structure length | Front principal point position | Rear principal point position |
|---|---|---|---|---|---|
| 1 | 1 | −32.28 | 14.95 | 6.03 | −6.20 |
| 2 | 5 | −296.82 | 6.66 | 13.25 | 7.81 |
| 3 | 9 | 168.81 | 2.45 | 0.29 | −1.04 |
| 4 | 11 | 67.08 | 6.25 | −0.39 | −4.54 |
| 5 | 14 | 48.32 | 10.58 | 0.40 | −6.26 |
| 6 | 17 | −28.16 | 2.84 | 1.10 | −0.49 |
| 7 | 20 | 59.97 | 16.52 | −8.53 | −16.43 |

(Numerical Data 6)

Unit mm

Surface data

| Surface number i | ri | di | ndi | vdi | Effective diameter |
|---|---|---|---|---|---|
| 1 | 134.732 | 2.00 | 1.80440 | 39.6 | 62.65 |
| 2 | 59.235 | 9.29 | 1.49700 | 81.5 | 56.52 |
| 3 | 1289.931 | 0.15 | | | 54.69 |
| 4 | 61.506 | 7.03 | 1.59522 | 67.7 | 53.15 |
| 5 | 427.052 | (Variable) | | | 52.31 |
| 6* | 2282.895 | 1.70 | 1.85400 | 40.4 | 35.34 |
| 7* | 21.839 | 6.07 | | | 27.28 |
| 8 | −103.185 | 1.40 | 1.76385 | 48.5 | 27.06 |
| 9 | 56.531 | (Variable) | | | 25.44 |
| 10 | 139.133 | 2.49 | 1.71736 | 29.5 | 22.52 |
| 11 | −100.758 | 1.89 | | | 22.23 |
| 12 | −26.067 | 1.20 | 1.49700 | 81.5 | 22.22 |
| 13 | 2740.628 | (Variable) | | | 23.72 |
| 14 | 425.774 | 2.48 | 1.85478 | 24.8 | 24.49 |
| 15 | −88.333 | (Variable) | | | 25.02 |
| 16 | ∞ | 0.50 | | | (Variable) |
| 17 (Stop) | ∞ | (Variable) | | | 26.12 |
| 18 | 27.819 | 5.89 | 1.49700 | 81.5 | 28.35 |
| 19 | 517.799 | 0.15 | | | 28.10 |
| 20 | 27.450 | 1.40 | 1.90366 | 31.3 | 27.57 |
| 21 | 16.264 | 8.67 | 1.58313 | 59.4 | 25.31 |
| 22* | −114.311 | (Variable) | | | 24.66 |
| 23 | −164.050 | 2.97 | 1.75520 | 27.5 | 20.88 |
| 24 | −28.040 | 1.00 | 1.77250 | 49.6 | 20.55 |
| 25* | 43.051 | 0.31 | | | 19.63 |
| 26 | 21.911 | 1.95 | 1.72047 | 34.7 | 19.55 |
| 27 | 26.988 | (Variable) | | | 19.18 |
| 28 | 25.886 | 3.97 | 1.51633 | 64.1 | 20.02 |
| 29 | −312.443 | 0.15 | | | 19.69 |
| 30 | 92.860 | 1.10 | 2.00100 | 29.1 | 19.48 |
| 31 | 15.493 | 4.71 | 1.49700 | 81.5 | 18.72 |
| 32 | 90.399 | 1.14 | | | 19.22 |
| 33 | 73.002 | 7.40 | 1.59270 | 35.3 | 19.85 |
| 34 | −13.607 | 1.20 | 1.88300 | 40.8 | 20.27 |
| 35 | −56.475 | | | | 22.41 |

Aspherical surface data

Sixth surface

K = 0.00000e+000    A4 = 1.32958e−005    A6 = −3.31821e−008
A8 = 4.28564e−011    A10 = −9.92190e−015    A12 = −2.25380e−017

Seventh surface

K = 0.00000e+000    A4 = 8.28703e−006    A6 = −5.61753e−009
A8 = −1.43139e−011    A10 = −1.63659e−013

Twenty-second surface

K = 0.00000e+000    A4 = 1.22081e−005    A6 = −1.15842e−008
A8 = −2.54496e−012    A10 = 8.22211e−014

Unit mm

Twenty-fifth surface

K = 0.00000e+000  A4 = −4.55562e−006  A6 = −1.07781e−009
A8 = 1.03386e−010  A10 = −7.08986e−013

Various data
Zoom ratio 9.66

|  | Wide angle | Intermediate | Telephoto |
|---|---|---|---|
| Focal length | 24.33 | 99.99 | 234.97 |
| F-number | 4.10 | 6.00 | 6.45 |
| Half angle of field (degree) | 41.64 | 12.21 | 5.26 |
| Image height | 21.64 | 21.64 | 21.64 |
| Total lens length | 176.43 | 220.34 | 254.57 |
| BF | 38.74 | 85.06 | 92.15 |
| d5 | 0.90 | 31.18 | 63.18 |
| d9 | 8.10 | 4.81 | 9.78 |
| d13 | 3.46 | 5.76 | 0.81 |
| d15 | 19.51 | 1.50 | 1.50 |
| d17 | 19.06 | 5.37 | 0.50 |
| d22 | 1.17 | 6.53 | 7.54 |
| d27 | 7.28 | 1.91 | 0.90 |
| ea16 | 16.63 | 23.88 | 26.12 |

Zoom lens unit data

| Unit | First surface | Focal length | Lens structure length | Front principal point position | Rear principal point position |
|---|---|---|---|---|---|
| 1 | 1 | 115.18 | 18.47 | 5.50 | −6.43 |
| 2 | 6 | −15.37 | 9.17 | 3.05 | −4.19 |
| 3 | 10 | −155.36 | 5.58 | 8.36 | 3.98 |
| 4 | 14 | 85.78 | 2.48 | 1.11 | −0.23 |
| 5 | 16 | ∞ | 0.50 | 0.25 | −0.25 |
| 6 | 18 | 29.74 | 16.10 | 2.63 | −8.07 |
| 7 | 23 | −59.67 | 6.23 | 3.26 | −0.38 |
| 8 | 28 | −964.77 | 19.67 | 101.43 | 79.44 |

TABLE 1

| | | Embodiment 1 | Embodiment 2 | Embodiment 3 | Embodiment 4 | Embodiment 5 | Embodiment 6 |
|---|---|---|---|---|---|---|---|
| | Zoom type | Positive, negative, negative, positive, positive, negative, negative | Positive, negative, negative, positive, positive, negative, positive | Positive, negative, negative, positive, positive, positive, negative, negative | Positive, negative, negative, positive, positive, positive | Negative, negative, positive, positive, positive, negative, positive | Positive, negative, negative, positive, positive, negative, negative |
| Conditional expression | Ln1 | Negative, negative | Negative, negative | Negative, negative | Negative, negative | Negative, negative | Negative, negative |
| | Ln2 | Negative, positive | Negative, negative, positive | Negative, positive | Negative, positive | Negative, positive | Negative, positive |
| | fw | 24.3 | 24.3 | 24.6 | 24.3 | 24.6 | 24.3 |
| | ft | 234.98 | 234.87 | 234 | 200 | 100 | 234.97 |
| (1) | βLn2w | 0.8044 | 0.7212 | 0.7936 | 0.8074 | 0.8178 | 0.8007 |
| (2) | βLn2t | 0.7747 | 0.6644 | 0.772 | 0.7866 | 0.8178 | 0.77 |
| (3) | βLp1w | 1.5435 | 1.7602 | 1.5334 | 1.5445 | 1.3901 | 1.5821 |
| (4) | βLp1t | 1.6329 | 1.8007 | 1.6387 | 1.6255 | 1.3901 | 1.6464 |
| | fLn1 | −15.3 | −15.66 | −15.31 | −16.14 | −32.28 | −15.37 |
| | fLn2 | −159.24 | −87.68 | −164.94 | −165.82 | −296.82 | −155.36 |
| | fLp1 | 86.8 | 64.99 | 87.38 | 92.32 | 166.81 | 85.78 |
| | fLp2 | 29.82 | 28.22 | 58.44 | 57.98 | 48.32 | 29.74 |
| | fL1 | 115.35 | 118.54 | 115.42 | 126.32 | — | 115.18 |
| (5) | −fLn2/fLp1 | 1.835 | 1.349 | 1.888 | 1.796 | 1.758 | 1.811 |
| (6) | fLn2/fLn1 | 10.408 | 5.599 | 10.773 | 10.274 | 9.195 | 10.108 |
| (7) | fL1/fw | 4.747 | 4.878 | 4.692 | 5.198 | — | 4.734 |
| (8) | −fLn1/fw | 0.630 | 0.644 | 0.622 | 0.664 | 1.312 | 0.632 |
| (9) | −fLn2/fw | 6.553 | 3.608 | 6.705 | 6.824 | 12.066 | 6.386 |
| (10) | fLp1/fw | 3.572 | 2.674 | 3.552 | 3.799 | 6.862 | 3.526 |
| (11) | fLp2/fw | 1.227 | 1.161 | 2.376 | 2.386 | 1.964 | 1.222 |
| (12) | dnpw/fw | 0.101 | 0.203 | 0.029 | 0.053 | 0.033 | 0.142 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-032885, filed Feb. 24, 2016 and Japanese Patent Application No. 2016-040916, filed Mar. 3, 2016, which are hereby incorporated by reference herein in their entirety.

What is claimed is:

1. A zoom lens, comprising:
a lens unit Ln1 having a negative refractive power;
a lens unit Ln2 having a negative refractive power arranged adjacent to and on an image side of the lens unit Ln1;
a lens unit Lp1 having a positive refractive power arranged adjacent to and on the image side of the lens unit Ln2; and
a rear lens group including one or more lens units arranged on the image side of the lens unit Lp1,
wherein an interval between each pair of adjacent lens units is changed during zooming,
wherein the lens unit Ln1 and the lens unit Lp1 are moved along the same locus during zooming, and
wherein the lens unit Ln2 is moved toward the object side during focusing from infinity to proximity.

2. A zoom lens according to claim 1,
wherein the rear lens group comprises a lens unit Lp2 having a positive refractive power, the lens unit Lp2 being a lens unit having a shortest focal length among lens units having positive refractive powers included in the zoom lens, and
wherein an interval between the lens unit Lp1 and the lens unit Lp2 is smaller at a telephoto end than at a wide angle end.

3. A zoom lens according to claim 2, wherein the following conditional expression is satisfied:

$$0.8 < fLp2/fw < 3.0,$$

where fLp2 represents a focal length of the lens unit Lp2, and fw represents a focal length of an entire system of the zoom lens at the wide angle end.

4. A zoom lens according to claim 1, wherein the following conditional expression is satisfied:

$$0.4 < -fLn1/fw < 1.5,$$

where fLn1 represents a focal length of the lens unit Ln1, and fw represents a focal length of an entire system of the zoom lens at a wide angle end.

5. A zoom lens according to claim 1, wherein the following conditional expression is satisfied:

$$2.0 < -fLn2/fw < 13.5,$$

where fLn2 represents a focal length of the lens unit Ln2, and fw represents a focal length of an entire system of the zoom lens at a wide angle end.

6. A zoom lens according to claim 1, wherein the following conditional expression is satisfied:

$$2.0 < fLp1/fw < 8.0,$$

where fLp1 represents a focal length of the lens unit Lp1, and fw represents a focal length of an entire system of the zoom lens at a wide angle end.

7. A zoom lens according to claim 1, wherein the following conditional expressions are satisfied:

$$0.0 < \beta Ln2w < 1.0; \text{ and}$$

$$0.0 < \beta Ln2t < 1.0,$$

where $\beta Ln2w$ represents an image pickup magnification of the lens unit Ln2 at a wide angle end, and $\beta Ln2t$ represents an image pickup magnification of the lens unit Ln2 at a telephoto end.

8. A zoom lens according to claim 1, wherein the following conditional expression is satisfied:

$$1.1 < \beta Lp1w < 5.0,$$

where $\beta Lp1w$ represents an image pickup magnification of the lens unit Lp1 at a wide angle end.

9. A zoom lens according to claim 1, wherein the following conditional expression is satisfied:

$$1.1 < \beta Lp1t < 5.0,$$

where $\beta Lp1t$ represents an image pickup magnification of the lens unit Lp1 at a telephoto end.

10. A zoom lens according to claim 1, wherein the following conditional expression is satisfied:

$$1.1 < -fLn2/fLp1 < 2.5,$$

where fLn2 represents a focal length of the lens unit Ln2, and fLp1 represents a focal length of the lens unit Lp1.

11. A zoom lens according to claim 1, wherein the following conditional expression is satisfied:

$$2.0 < fLn2/fLn1 < 20.0,$$

where fLn1 represents a focal length of the lens unit Ln1, and fLn2 represents a focal length of the lens unit Ln2.

12. A zoom lens according to claim 1, wherein the lens unit Ln1 comprises two or more negative lenses.

13. A zoom lens according to claim 1, wherein the lens unit Ln2 comprises a negative lens and a positive lens.

14. A zoom lens according to claim 1, wherein an interval between the lens unit Ln1 and the lens unit Ln2 is larger at a telephoto end than at a wide angle end.

15. A zoom lens according to claim 1, further comprising a lens unit L1 having a positive refractive power on the object side of the lens unit Ln1,
wherein an interval between the lens unit L1 and the lens unit Ln1 is larger at a telephoto end than at a wide angle end.

16. A zoom lens according to claim 15, wherein the lens unit L1 is moved toward the object side during zooming from the wide angle end to the telephoto end.

17. A zoom lens according to claim 15, wherein the following conditional expression is satisfied:

$$2.0 < fL1/fw < 7.0$$

where fL1 represents a focal length of the lens unit L1, and fw represents a focal length of an entire system of the zoom lens at the wide angle end.

18. A zoom lens according to claim 1,
wherein the rear lens group consists of a lens unit L5 having a positive refractive power, a lens unit L6 having a negative refractive power, and a lens unit L7 having a negative refractive power, which are arranged in order from the object side to the image side, and
wherein the lens unit L5 comprises a lens unit having a shortest focal length among lens units having positive refractive powers included in the zoom lens.

19. A zoom lens according to claim 1,
wherein the rear lens group consists of a lens unit L5 having a positive refractive power, a lens unit L6 having a negative refractive power, and a lens unit L7 having a positive refractive power, which are arranged in order from the object side to the image side, and wherein the lens unit L5 is a lens unit having a shortest focal length among lens units having positive refractive powers included in the zoom lens.

20. A zoom lens according to claim 1, wherein the rear lens group consists of a lens unit L5 having a positive refractive power, a lens unit L6 having a positive refractive power, a lens unit L7 having a negative refractive power, and a lens unit L8 having a negative refractive power, which are arranged in order from the object side to the image side, and wherein the lens unit L6 comprises a lens unit having a shortest focal length among lens units having positive refractive powers included in the zoom lens.

21. A zoom lens according to claim 1, wherein the rear lens group consists of a lens unit L5 having a positive refractive power, and a lens unit L6 having a positive refractive power, which are arranged in order from the object side to the image side, and wherein the lens unit L6 is a lens unit having a shortest focal length among lens units having positive refractive powers included in the zoom lens.

22. A zoom lens according to claim 1, wherein the rear lens group consists of a lens unit L4 having a positive refractive power, a lens unit L5 having a positive refractive power, a lens unit L6 having a negative refractive power, and a lens unit L7 having a positive refractive power, which are arranged in order from the object side to the image side, and wherein the lens unit L5 comprises a lens unit having a shortest focal length among lens units having positive refractive powers included in the zoom lens.

23. A zoom lens according to claim 1, wherein the following conditional expression is satisfied:

$$0.01 < dnpw/fw < 1.00,$$

where dnpw represents an interval between the lens unit Ln2 and the lens unit Lp1 at a wide angle end, and fw represents a focal length of an entire system of the zoom lens at the wide angle end.

24. A zoom lens, comprising:

a lens unit Ln1 having a negative refractive power;

a lens unit Ln2 having a negative refractive power arranged adjacent to and on an image side of the lens unit Ln1;

a lens unit Lp1 having a positive refractive power arranged adjacent to and on the image side of the lens unit Ln2; and a rear lens group including one or more lens units arranged on the image side of the lens unit Lp1, wherein an interval between each pair of adjacent lens units is changed during zooming, wherein the rear lens group comprises a lens unit Lp2 having a positive refractive power, the lens unit Lp2 is a lens unit having a shortest focal length among lens units having positive refractive powers included in the zoom lens, wherein the lens unit Ln2 is moved toward the object side during focusing from infinity to proximity, and wherein the zoom lens satisfies the following conditional expression:

$$3.0 < fLn2/fLn1 < 20.0,$$

where fLn1 represents a focal length of the lens unit Ln1, and fLn2 represents a focal length of the lens unit Ln2.

25. An image pickup apparatus, comprising: a zoom lens; and an image sensor which receives an image formed by the optical system, the zoom lens comprising:

a lens unit Ln1 having a negative refractive power;

a lens unit Ln2 having a negative refractive power arranged adjacent to and on an image side of the lens unit Ln1;

a lens unit Lp1 having a positive refractive power arranged adjacent to and on the image side of the lens unit Ln2; and a rear lens group including one or more lens units arranged on the image side of the lens unit Lp1, wherein an interval between each pair of adjacent lens units is changed during zooming, wherein the lens unit Ln1 and the lens unit Lp1 are moved along the same locus during zooming, and wherein the lens unit Ln2 is moved toward the object side during focusing from infinity to proximity.

26. An image pickup apparatus, comprising:

a zoom lens; and an image sensor which receives an image formed by the optical system, the zoom lens comprising:

a lens unit Ln1 having a negative refractive power;

a lens unit Ln2 having a negative refractive power arranged adjacent to and on an image side of the lens unit Ln1;

a lens unit Lp1 having a positive refractive power arranged adjacent to and on the image side of the lens unit Ln2; and a rear lens group including one or more lens units arranged on the image side of the lens unit Lp1, wherein an interval between each pair of adjacent lens units is changed during zooming, wherein the rear lens group comprises a lens unit Lp2 having a positive refractive power, the lens unit Lp2 being a lens unit having a shortest focal length among lens units having positive refractive powers included in the zoom lens, wherein the lens unit Ln2 is moved toward the object side during focusing from infinity to proximity, and wherein the zoom lens satisfies the following conditional expression:

$$3.0 < fLn2/fLn1 < 20.0,$$

where fLn1 represents a focal length of the lens unit Ln1, and fLn2 represents a focal length of the lens unit Ln2.

* * * * *